United States Patent
Kodato et al.

(10) Patent No.: US 6,204,083 B1
(45) Date of Patent: Mar. 20, 2001

(54) PROCESS FOR PRODUCING INFRARED EMITTING DEVICE AND INFRARED EMITTING DEVICE PRODUCED BY THE PROCESS

(75) Inventors: Setsuo Kodato, Atsugi; Seishiro Ohya; Shiro Karasawa, both of Fujisawa; Hiroyasu Yuasa, Atsugi; Kenji Akimoto, Yokosuka, all of (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/000,407
(22) PCT Filed: May 30, 1997
(86) PCT No.: PCT/JP97/01847
  § 371 Date: Jan. 29, 1998
  § 102(e) Date: Jan. 29, 1998
(87) PCT Pub. No.: WO97/47159
  PCT Pub. Date: Dec. 11, 1997

(30) Foreign Application Priority Data

Jun. 3, 1996 (JP) .................................................. 8-162387

(51) Int. Cl.$^7$ .......................... H01L 21/00; H05B 3/10; G01J 3/10
(52) U.S. Cl. .................................. 438/43; 438/45; 438/57
(58) Field of Search ..................... 438/48, 57, FOR 136, 438/FOR 137, 43, 45, 22

(56) References Cited

U.S. PATENT DOCUMENTS

| | | | |
|---|---|---|---|
| 4,966,037 | * 10/1990 | Sumner et al. | 73/204.26 |
| 5,012,671 | * 5/1991 | Yagawara et al. | 73/31.06 |
| 5,019,885 | * 5/1991 | Yagawara et al. . | |

FOREIGN PATENT DOCUMENTS

| | | |
|---|---|---|
| 63-152893 | 6/1988 | (JP) . |
| 4-174990 | 6/1992 | (JP) . |
| 6-207262 | 7/1994 | (JP) . |

OTHER PUBLICATIONS

Microheater Made Of Heavily Boron Doped Single Crystal Silicon Beam, Kimura et al, Technical Digest of the 11th Sensor Symposium, 1992, pp. 169–172.

Infrared Reflectivity And Transmissivity Of Boron–Implanted, Laser–Annealed Silicon, Herbert Engstrom, J. Appl. Phys., pp. 5245–5249, 51 (10), Oct., 1980.

* cited by examiner

Primary Examiner—Mary Wilczewski
(74) Attorney, Agent, or Firm—Frishauf, Holtz, Goodman, Langer & Chick, P.C.

(57) ABSTRACT

In order, to manufacture a high-performance infrared-emitting element having high-speed thermal response characteristics and a high infrared emissivity, a bridge (heat-generating) portion having a separation space is formed on a silicon element substrate. The bridge portion is formed to have a thickness of 5 $\mu$m or less by doping boron as an impurity by ion implantation with a concentration distribution peak value of $1.5 \times 10^{19}$ atoms/cm$^3$ or more, and performing annealing under predetermined conditions for activating the impurity layer. In the infrared-emitting element manufactured in this manner, even if the bridge portion is made thin to improve the thermal response characteristics, the infrared emissivity does not decrease because of a high impurity concentration, and a large temperature modulation width can be obtained. In doping boron as the impurity by ion implantation, the dose is preferably set to $3.0 \times 10^{14}$ ions/cm$^2$ or more. To activate the impurity layer upon doping boron, the annealing is performed in the nitrogen gas atmosphere at a temperature of 1,100° C. to 1,200° C. for 5 min to 40 min and further in the wet oxygen atmosphere for about 25 min to 40 min. As a result, the doping concentration of boron by ion implantation and the activation of the impurity layer can be stably increased and enhanced.

13 Claims, 15 Drawing Sheets

PROCESS FOR PRODUCING INFRARED EMITTING DEVICE AND INFRARED EMITTING DEVICE PRODUCED BY THE PROCESS

TECHNICAL FIELD

The present invention relates to an infrared-emitting element manufacturing method and an infrared-emitting element manufactured thereby and, more particularly, to a method of manufacturing an infrared-emitting element for emitting infrared rays by causing a bridge (heat-generating) portion made up of a silicon micromachining to generate heat, and an infrared-emitting element manufactured thereby.

BACKGROUND ART

As an infrared-emitting element used for a gas analysis sensor or the like, an infrared-emitting element for emitting infrared rays from a filament by energizing the filament to make it generate heat has conventionally been used.

Reference numeral 101 in FIG. 22 denotes a conventional gas analysis system using an infrared-emitting element 102 with a filament.

More specifically, in this gas analysis system, infrared rays 141 emitted by the filament of the infrared-emitting element 102 are intermittently shielded by a chopper 142, and become modulated infrared rays 144, which enter a gas 143 via a filter 146.

The modulated infrared rays 144 transmitting through the gas 143 are received by a light-receiving element 145.

This gas analysis system 101 calculates the concentration of the gas 143 from the ratio of the maximum value to minimum value of the light-receiving power level upon receiving the modulated infrared rays 144.

Accordingly, the gas analysis system 101 requires the modulated infrared rays 144, and must comprise the chopper 142 because the infrared-emitting element 102 can emit only constant infrared rays.

In recent years, it is required that small-sized, low-cost gas analysis systems.

Development of infrared-emitting elements capable of modulated emitting infrared rays without using any chopper 142 is required.

Many infrared-emitting elements using a ceramic bulk material as a heat-generating element, a silicon micromachining, and the like have been developed.

In an infrared-emitting element using a ceramic bulk material as a heat-generating element, however, infrared rays cannot be modulated at a high frequency because the thermal conductivity of a high-temperature portion is small, and the heat capacity of the bulk material is large.

For example, when this infrared-emitting element emits infrared rays at 48 Hz, the difference between the lowest and highest temperatures at the heat-generating portion is only 150° C. and hence the difference between the minimum and maximum emission quantities of infrared rays is small.

In an infrared-emitting element using a silicon micromachining, as described in the following reference, boron is thermally diffused as a p$^+$-type impurity into a silicon bridge structure to selectively etch and remove a sacrificial n-type layer. The p$^+$-type layer of the silicon structure is formed into a bridge-building structure, and the bridge-building portion is made to generate heat, thereby emitting infrared rays (reference: Technical Digest of the 11th Sensor Symposium, 1992, pp. 169–172, Kimura et al.).

In the infrared-emitting element using the silicon micromachining, since the p$^+$-type layer is formed by thermally diffusing boron, the bridge portion of the bridge-building structure is too thick, resulting in poor thermal response characteristics for the driving power.

If the bridge portion can be made thin, the thermal response characteristics for the applied electric power can be improved drastically.

However, when the bridge portion obtained by thermally diffusing boron is decreased in thickness to about the reciprocal of the absorption coefficient at a necessary infrared wavelength, the emissivity of infrared rays rapidly decreases to weaken the infrared emission intensity. At present, only an infrared-emitting element using a silicon micromachining with a bridge portion having a thickness of about 5 μm is realized.

In the conventional infrared-emitting element using the silicon micromachining obtained by thermally diffusing boron as a p$^+$-type impurity, the thermal response characteristics are poor because of the thick bridge portion. If infrared rays are emitted under constant-voltage driving, an excessively large current may flow to fuse the bridge portion because a long time is needed to increase the resistance value by temperature rise upon applying the voltage.

To avoid this situation, a protective circuit must be arranged as a driving circuit for the infrared-emitting element, or a constant-current driving method must be employed. This complicates the arrangement of the driving circuit.

The conventional infrared-emitting element using the silicon micromachining obtained by thermally diffused boron as a p$^+$-type impurity poses the above problems because the concentration of boron and the diffusion profile cannot be independently controlled with high precision in thermally diffusion method.

For an infrared-emitting element of this type, the concentration of boron and activation of boron to serve for an impurity layer are important factors to promote the emissivity of infrared rays.

However, thermal diffusion leads to a low concentration of boron and weak activation of boron to serve for an impurity layer, so the bridge portion cannot be made thin. Heretofore, even if a thin bridge portion can be formed, the emissivity of infrared rays decreases.

In thermal diffusion method, a thickness of the bridge portion is limited by a mechanical safety after etching.

DISCLOSURE OF INVENTION

The present invention has been made to solve the problems in the prior art, and has as its object to provide an infrared-emitting element manufacturing method capable of efficiently manufacturing, with high mass productivity at low cost, a high-performance infrared-emitting element which has high-speed thermal response characteristics and a high infrared emissivity, can be driven by a simple driving circuit, and enables stable constant-voltage driving, and an infrared-emitting element manufactured by the above method.

To achieve the above object, according to the present invention, there is provided an infrared-emitting element manufacturing method comprising steps of preparing a single-crystal silicon substrate the serving as an element substrate, forming an impurity layer as a heavily doped region by doping boron from an upper surface side of the element substrate by ion implantation at a peak concentration of not less than $1.5 \times 10^{19}$ atoms/cm$^3$ in order to form a heat-generating portion having a predetermined shape on the element substrate, performing annealing for the element substrate having the impurity layer under a predetermined condition for activating the impurity layer, forming a pair of electrodes to ohmic-contact two ends of the impurity layer in order to form an applying portion of a driving voltage for the heat-generating portion on the element substrate, and removing a lower portion of the impurity layer including a middle portion by anisotropic etching and forming a separation space in order to form the heat-generating portion on the element substrate into a bridge shape, wherein, when the driving voltage is applied to the heat-generating portion via the pair of electrodes, the heat-generating portion having the bridge shape can emit infrared rays in accordance with the driving voltage.

To achieve the above object, according to the present invention, there is provided an infrared-emitting element manufacturing method characterized in that the ion implantation is performed by doping boron at a dose of at least not less than $3.0 \times 10^{-14}$ ions/cm$^2$.

To achieve the above object, according to the present invention, there is provided an infrared-emitting element manufacturing method characterized in that the heat-generating portion is formed to have a thickness of not less than 0.2 µm and not more than 5 µm.

To achieve the above object, according to the present invention, there is provided an infrared-emitting element manufacturing method characterized in that the heat-generating portion is formed to emit infrared rays at an emissivity of not less than 0.5.

To achieve the above object, according to the present invention, there is provided an infrared-emitting element manufacturing method characterized in that the heavily doped region is arranged at a center of the heat-generating portion, and a high-resistance portion narrower than each of two ends of the heat-generating portion is formed in the heavily doped region.

To achieve the above object, according to the present invention, there is provided an infrared-emitting element manufacturing method characterized in that regions each having a higher impurity concentration than an impurity concentration of the heavily doped region are formed on two sides of the heavily doped region.

To achieve the above object, according to the present invention, there is provided an infrared-emitting element manufacturing method characterized in that the heavily doped region is arranged at a center of the heat-generating portion, and regions each having a lower impurity concentration than an impurity concentration of the heavily doped region are formed on two sides of the heavily doped region.

To achieve the above object, according to the present invention, there is provided an infrared-emitting element manufacturing method characterized by further comprising the steps of preparing a package having an infrared-transmitting portion capable of transmitting infrared rays, and airtightly containing the element substrate in the package, wherein infrared rays can be emitted via the infrared-transmitting portion.

To achieve the above object, according to the present invention, there is provided an infrared-emitting element manufacturing method characterized in that the infrared-transmitting portion is formed of a silicon plate.

To achieve the above object, according to the present invention, there is provided an infrared-emitting element manufacturing method characterized by further comprising the step of forming a Fresnel lens by cutting a concentric groove in the silicon plate.

To achieve the above object, according to the present invention, there is provided an infrared-emitting element manufacturing method characterized in that to make the heavily doped region of the heat-generating portion generate heat, and emit infrared rays, when a voltage having a frequency of not more than 100 Hz is applied across the pair of electrodes, a temperature modulation width of the heavily doped region is set to not less than 700° C. and not more than 1,100° C.

To achieve the above object, according to the present invention, there is provided an infrared-emitting element manufacturing method characterized in that to make the heavily doped region of the heat-generating portion generate heat, and emit infrared rays, when a voltage having a frequency of not more than 1000 Hz is applied across the pair of electrodes, a temperature modulation width of the heavily doped region is set to not less than 100° C.

To achieve the above object, according to the present invention, there is provided an infrared-emitting element manufacturing method characterized in that the annealing is performed in a nitrogen gas atmosphere at 1,100° C. to 1,200° C. for 5 min to 40 min and further in a wet oxygen atmosphere for about 25 min to 40 min.

To achieve the above object, according to the present invention, there is provided an infrared-emitting element manufactured by an infrared-emitting element manufacturing method comprising the steps of preparing a single-crystal silicon substrate serving as an element substrate, forming an impurity layer as a heavily doped region by doping boron from an upper surface side of the element substrate by ion implantation at a peak concentration of not less than $1.5 \times 10^{19}$ atoms/cm$^3$ in order to form a heat-generating portion having a predetermined shape on the element substrate, performing annealing for the element substrate having the impurity layer under a predetermined condition for activating the impurity layer, forming a pair of electrodes to ohmic-contact two ends of the impurity layer in order to form an applying portion of a driving voltage for the heat-generating portion on the element substrate, and removing a lower portion of the impurity layer including a middle portion by anisotropic etching and forming a separation space in order to form the heat-generating portion on the element substrate into a bridge shape, wherein, when the driving voltage is applied to the heat-generating portion via the pair of electrodes, the heat-generating portion having the bridge shape can emit infrared rays in accordance with the driving voltage.

BEST MODE OF CARRYING OUT THE INVENTION

Figure 1A:
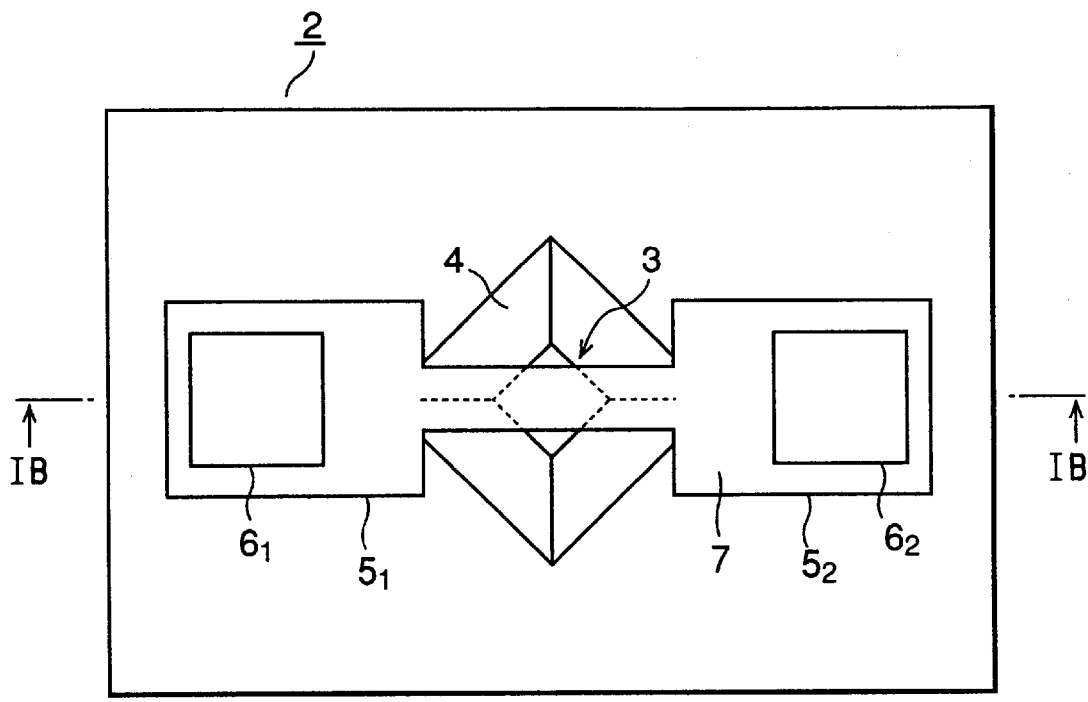
FIG. 1A is a plan view showing an example of an infrared-emitting element manufactured by the present invention.

The present invention will be generally described.

(1) To achieve the above object, the present invention is characterized by a method of manufacturing an infrared-emitting element which has an element substrate and a bridge (heat-generating) portion formed on the element substrate and shaped into a bridge-building structure by a separation space, and can emit infrared rays upon energization by a power supply, and an infrared-emitting element manufactured by the above method in which the bridge portion is formed to have a thickness of, e.g., 5 $\mu$m or less, and which is manufactured as an infrared-emitting element having a heavily doped region prepared by doping an impurity by ion implantation and subsequent annealing at a dose of $3.0 \times 10^{14}$ ions/cm$^2$ or more.

(2) The present invention is characterized by a method of manufacturing an infrared-emitting element which has an element substrate and a bridge portion formed on the element substrate and shaped into a bridge-building structure by a separation space, and can emit infrared rays from the bridge portion upon energization by a power supply, and an infrared-emitting element manufactured by the above method in which the bridge portion is formed to have a thickness of, e.g., 5 $\mu$m or less, and which is manufactured as an infrared-emitting element having a heavily doped region prepared by doping an impurity at a peak concentration of $1.5 \times 10^{19}$ atoms/cm$^3$ or more.

(3) In the infrared-emitting element manufacturing method in (1) or (2) and the infrared-emitting element manufactured by this method, the heavily doped region is formed at the center of the bridge portion, and a high-resistance portion narrower than each of the two ends of the bridge portion is formed in the heavily doped region.

(4) In (3), regions each having a higher impurity concentration than that of the heavily doped region are preferably formed on the two sides of the heavily doped region.

(5) In the infrared-emitting element manufacturing method in (1) or (2) and the infrared-emitting element manufactured by this method, the heavily doped region is arranged at the center of the bridge portion, and regions each having a lower impurity concentration than that of the heavily doped region are formed on the two sides of the heavily doped region.

(6) In the infrared-emitting element manufacturing method in any one of (1) to (5) and the infrared-emitting element manufactured by this method, the bridge portion may be made from silicon, and the impurity of the heavily doped region may contain boron.

(7) In the infrared-emitting element manufacturing method in any one of (1) to (6) and the infrared-emitting element manufactured by this method, a package having an infrared-transmitting portion capable of transmitting infrared rays is arranged, the element substrate is airtightly contained in the package, and infrared rays can be emitted via the infrared-transmitting portion.

(8) In (7), the infrared-transmitting portion can be made from a silicon substrate, a sapphire substrate, or the like.

(9) In (8), a concentric groove can be cut in the silicon substrate, the sapphire substrate, or the like to form a Fresnel lens.

(10) In the infrared-emitting element manufacturing method in any one of (1) to (9) and the infrared-emitting element manufactured by this method, to make the heavily doped region of the bridge portion generate heat, and emit infrared rays, the temperature modulation width of the heavily doped region can be set to 700° C. or higher and 1,100° C. or lower by applying a voltage having a frequency of 100 Hz or lower.

(11) In the infrared-emitting element manufacturing method in any one of (1) to (10) and the infrared-emitting element manufactured by this method, to make the heavily doped region of the bridge portion generate heat, and emit infrared rays, the temperature modulation width of the heavily doped region can be set to 100° C. or higher by applying a voltage having a frequency of 1000 Hz or lower.

The infrared-emitting element manufacturing method and the infrared-emitting element manufactured by this method according to the present invention described above are invented on the basis of the findings of the present inventors that, when an impurity is heavily doped in a thin bridge portion by ion implantation and subsequent annealing, and the bridge portion is made to generate heat as a heavily doped region, high-speed thermal response characteristics and a high emissivity coexist in infrared emission at a wavelength of about 1.4 $\mu$m to 14 $\mu$m.

This is based on the following experimental results.

To examine the relationship between the infrared wavelength and the infrared emissivity, boron is doped in an n-type single-crystal silicon substrate serving as an element substrate having a resistivity of 8 to 15 $\Omega\cdot$cm at a dose of $4.0\times10^{16}$ ions/cm$^2$ by using an ion implantation apparatus. The doped substrate is annealed to form an infrared-emitting element with a p$^+$-type layer having a depth of about 2.6 $\mu$m.

The entire p$^+$-type layer of the infrared-emitting element is energized as a heavily doped region, and heated to a temperature of 500° C. to measure the wavelength of infrared rays emitted by this layer, and the infrared emissivity.

As a comparative example, an n-type silicon substrate having a resistivity of 8 to 15 $\Omega\cdot$cm is heated to a temperature of 500° C. to similarly measure the wavelength and emissivity of infrared rays emitted by this substrate.

Figure 15:
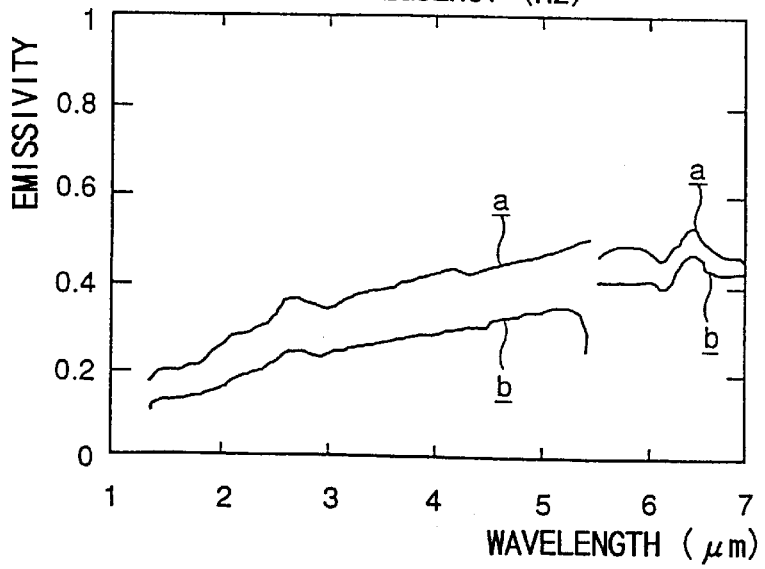
FIG. 15 is a graph showing the measurement results of the relationship between the wavelength of infrared rays emitted and the emissivity.

FIG. 15 shows the measurement results by plotting the wavelength ($\mu$m) of infrared rays emitted on the abscissa and the emissivity on the ordinate.

A graph a in FIG. 15 shows the relationship between the wavelength and emissivity of infrared rays emitted by the p$^+$-type layer. A graph b shows the relationship between the wavelength and emissivity of infrared rays emitted by the n-type substrate.

From these results, the infrared emissivity is high for a high impurity concentration regardless of the wavelength.

Since the experiment of this graph was conducted in the atmosphere, the emissivity is discontinuous around a wavelength of 5.5 $\mu$m owing to water absorption.

For the dependence of the impurity concentration, the relationship between the thickness of the p$^+$-type layer of the bridge portion and the emissivity will be examined.

The emissivity $\epsilon$ is calculated by equation (1) using the measured values of the transmittance T and the reflectance R at room temperature:

$$\epsilon = (1-R)(1-T)/(1-RT) \quad (1)$$

(reference: Herbert Engstrom, J. Appl. Phys., 5245, 51(10), October, 1980).

Figure 16A:
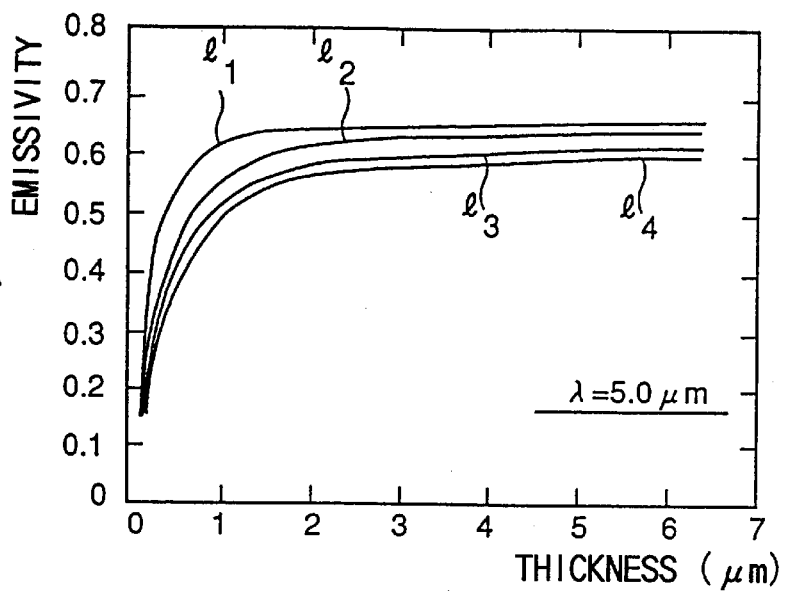
FIG. 16A is a graph showing the relationship between the thickness of an impurity layer and the emissivity of infrared rays emitted with a wavelength of 5.0 $\mu$m.
Figure 16B:
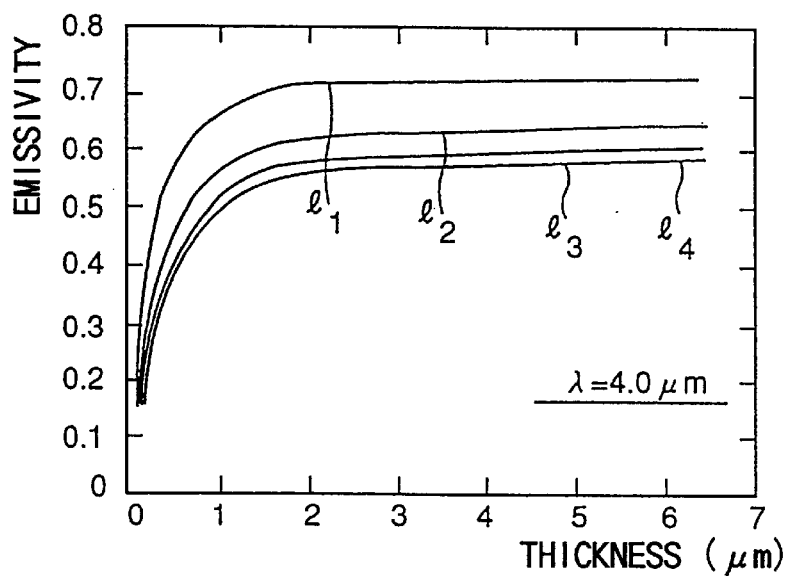
FIG. 16B is a graph showing the relationship between the thickness of the impurity layer and the emissivity of infrared rays emitted with a wavelength of 4.0 $\mu$m.
Figure 16C:
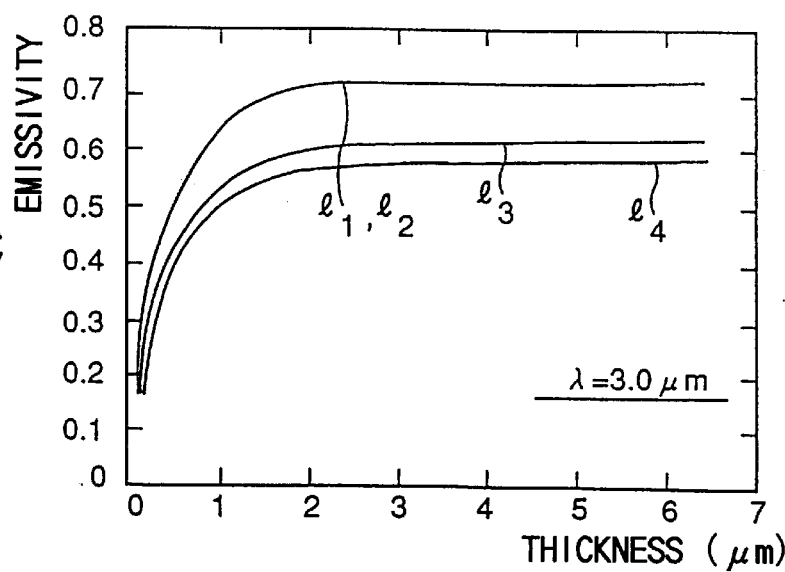
FIG. 16C is a graph showing the relationship between the thickness of the impurity layer and the emissivity of infrared rays emitted with a wavelength of 3.0 $\mu$m.

FIGS. 16A, 16B, and 16C respectively show the results for infrared wavelengths of 5.0 $\mu$m, 4.0 $\mu$m, and 3.0 $\mu$m by plotting the thickness ($\mu$m: diffusion depth) of the p$^+$-type layer on the abscissa and the emissivity $\epsilon$ on the ordinate.

In FIGS. 16A to 16C, a graph $l_1$ is for a boron dose of $3.0\times10^{15}$ ions/cm$^2$, a graph $l_2$ for $1.0\times10^{15}$ ions/cm$^2$, a graph $l_3$ for $3.0\times10^{14}$ ions/cm$^2$, and a graph $l_4$ for $1.0\times10^{14}$ ions/cm$^2$.

As is apparent from FIGS. 16A, 16B, and 16C, the infrared emissivity is higher for a larger thickness of the p$^+$-type layer, and starts decreasing when the thickness decreases to about 2.0 $\mu$m or less.

For a wavelength of 5.0 $\mu$m, even if the thickness is 3.0 $\mu$m or less, the emissivity hardly decreases as long as the thickness is 1.0 $\mu$m or more.

For an infrared wavelength of 3.0 $\mu$m, even if the thickness is 1.0 $\mu$m or more, the emissivity rapidly decreases when the thickness decreases to about 2.0 $\mu$m or less.

In either wavelength, as the impurity concentration is higher, the infrared emissivity is higher. The infrared wavelength generally required is 1.4 $\mu$m to 14 $\mu$m, and the dose of the p$^+$-type layer must be increased for a shorter wavelength.

Even for a small dose, by setting the thickness to, e.g., 1.0 $\mu$m or more, an infrared emissivity of 0.5 or more can be obtained even on the graph $l_3$ ($1.0\times10^{15}$ ions/cm$^2$), and an infrared emissivity of 0.4 or more can be obtained even on the graph $l_4$ ($3\times10^{14}$ ions/cm$^2$). Therefore, a practically usable infrared-emitting element can be obtained.

When the thickness of the bridge portion is set to 1.0 $\mu$m or less to realize fast thermal response characteristics, the dose preferably falls within the range of the graph $l_3$ to the graph $l_4$ ($3.0\times10^{14}$ to $1.0\times10^{15}$ ions/cm$^2$), and more specifically, is set to $3.0\times10^{14}$ ions/cm$^2$ or more.

This value is converted into a concentration of $1.5\times10^{19}$ atoms/cm$^3$.

An n-type silicon substrate having a resistivity of 8 to 15 $\Omega\cdot$cm is used as an element substrate, and boron is doped in this substrate by ion implantation at a dose of $4.0\times10^{16}$ ions/cm$^2$. After the doped substrate is annealed at, e.g., 1,100° C., the surface of the silicon substrate is exposed, and the impurity profile is analyzed by a secondary ion mass spectrometer (SIMS).

Figure 17:
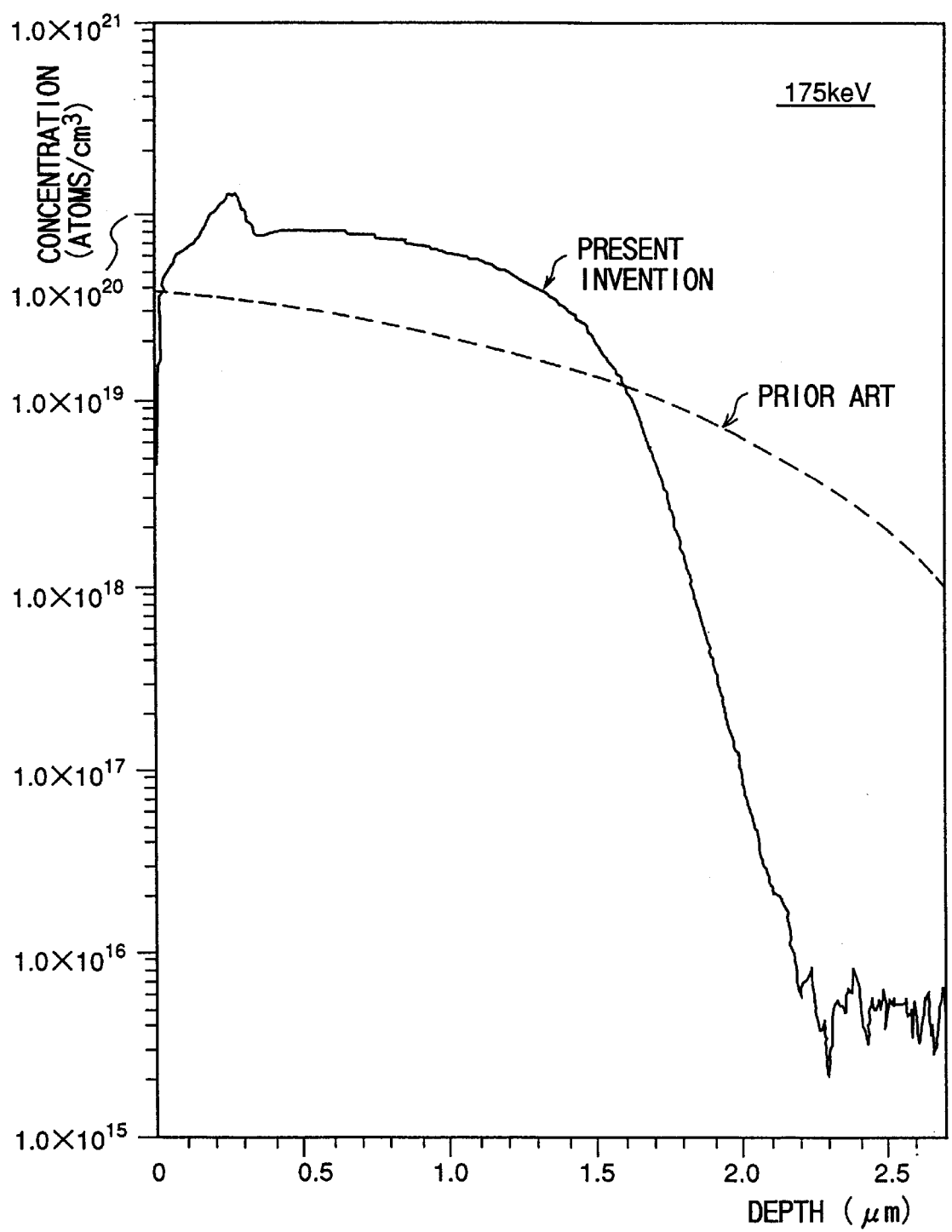
FIG. 17 is a graph showing the measurement results of the impurity concentration distribution by SIMS.

FIG. 17 is a graph showing the results.

In general, when an impurity is doped in an element substrate by ion implantation, the impurity concentration distribution is a one-sided Gaussian distribution having its peak within the element substrate. As the depth increases more than the peak position, the impurity concentration abruptly decreases.

In FIG. 17, also on the graph of the present invention indicated by the solid line, the concentration peak is at a depth of 0.3 $\mu$m from the surface of the silicon substrate. The concentration is kept at $10^{19}$ atoms/cm$^3$ or more up to a depth of about 1.5 $\mu$m from the surface of the silicon substrate. When the depth increases to more than about 2.0 $\mu$m, the concentration decreases to $1.0\times10^{16}$ atoms/cm$^3$ or less.

More specifically, this indicates that the concentration of boron and the doping profile can be independently controlled with high precision because boron is doped by ion implantation and annealed in the infrared-emitting element manufacturing method of the present invention, and that the infrared emissivity can be stably kept high value because a high concentration of boron and strong activation of the impurity layer can be realized.

Referring to FIG. 17, in the doping profile of the prior art using thermal diffusion of boron that is indicated by the broken line, the impurity concentration distribution is not a one-sided Gaussian distribution having its peak within the element substrate, unlike the present invention, and has characteristics in which the impurity concentration gradually decreases as the depth from the substrate surface increases.

This is because the concentration of boron and the diffusion profile cannot be independently controlled with high precision in thermal diffusion of boron, as described above.

In another doping such as laser doping, the peak position of the impurity concentration is normally on the surface.

When an impurity is doped by either method, of the impurity layer, only a heavily doped portion mainly contributes to infrared emission, and a lightly doped portion emits few infrared rays.

In the graph of FIG. 17, the peak value of the impurity concentration is around $1.0 \times 10^{20}$ atoms/cm$^3$. As the peak value is higher, the impurity concentration becomes higher to a deeper portion.

From the impurity concentration graph of FIG. 17, a portion having an impurity concentration of $1.5 \times 10^{19}$ atoms/cm$^3$ or less hardly emits infrared rays. The bridge portion of the infrared-emitting element must be set to prevent the impurity concentration peak in the direction of thickness from being lower than about $1.5 \times 10^{19}$ atoms/cm$^3$.

This impurity concentration is converted into a dose of $3.0 \times 10^{14}$ ions/cm$^2$.

The relationship between the implantation amount (dose) of boron and the infrared emissivity will be examined.

Also at this time, the infrared emissivity is measured without forming any space below the bottom surface of the p$^+$-type layer serving as a heavily doped region.

Figure 18A:
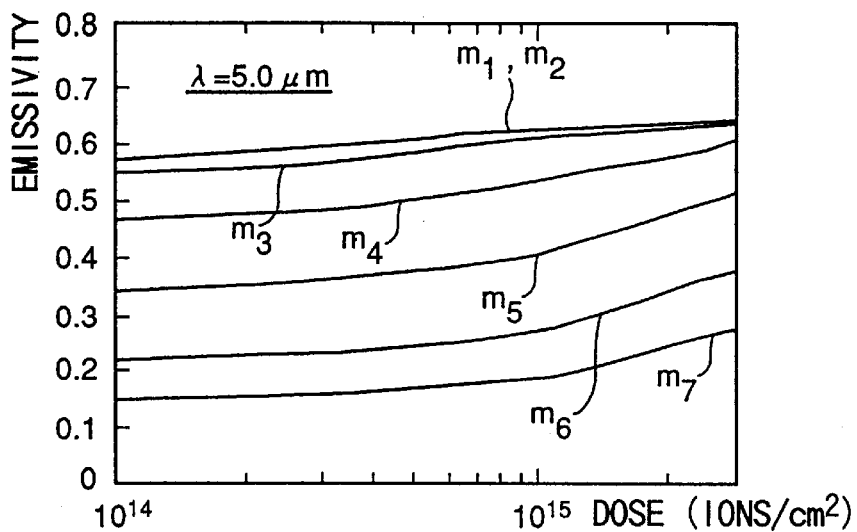
FIG. 18A is a graph showing the relationship between the dose and the emissivity of infrared rays emitted with a wavelength of 5.0 $\mu$m.
Figure 18B:
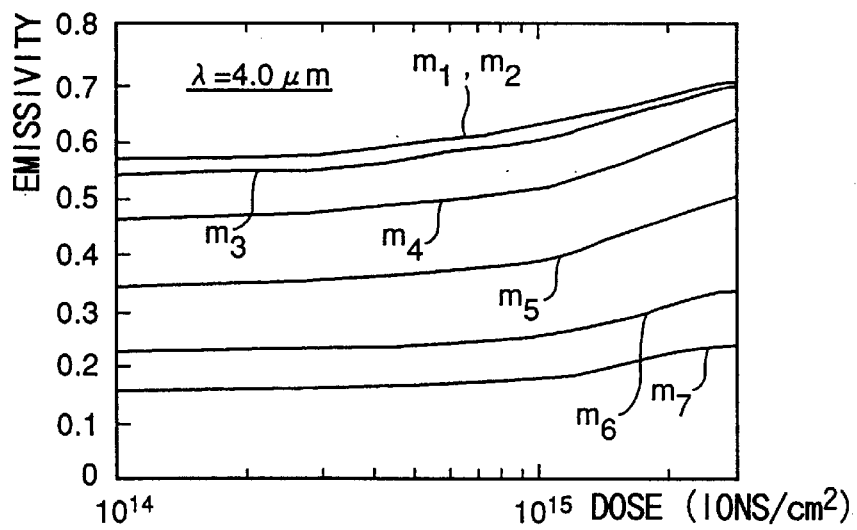
FIG. 18B is a graph showing the relationship between the dose and the emissivity of infrared rays emitted with a wavelength of 4.0 $\mu$m.
Figure 18C:
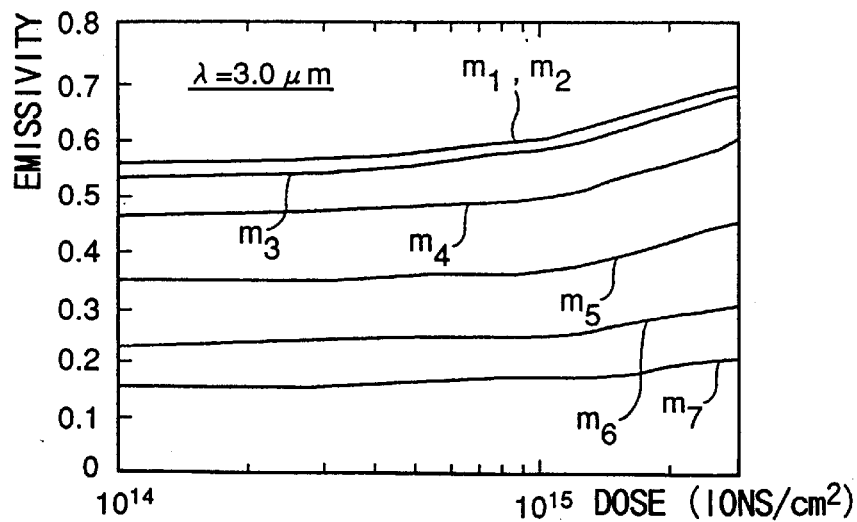
FIG. 18C is a graph showing the relationship between the dose and the emissivity of infrared rays emitted with a wavelength of 3.0 $\mu$m.

FIGS. 18A, 18B, and 18C are graphs respectively for infrared wavelengths of 5.0 μm, 4.0 μm, and 3.0 μm each for p$^+$-type layers having thicknesses of 0.12 μm to 6.4 μm by plotting the dose of boron on the abscissa and the emissivity on the ordinate.

In FIGS. 18A to 18C, a graph $m_1$ is for a p$^+$-type layer thickness of 6.4 μm, a graph $m_2$ for 3.2 μm, a graph $m_3$ for 1.6 μm, a graph $m_4$ for 0.8 μm, a graph $m_5$ for 0.4 μm, a graph $m_6$ for 0.2 μm, and a graph $m_7$ for 0.12 μm.

Infrared emissivities for thicknesses of 6.4 μm and 3.2 μm are too close to discriminate them from each other in FIGS. 18A, 18B, and 18C. Even if the thickness of the p$^+$-type layer is set to 3.2 μm or more, this does not contribute to an increase in infrared emissivity.

For a p$^+$-type layer having a thickness of 3.2 μm or less, the infrared emissivity decreases as the thickness decreases. By increasing the dose, the infrared emissivity can be increased.

From these results, the thickness of the bridge portion is set to 5 μm, and preferably to 3.2 μm or less, and desirably to 0.2 μm or more in order to maintain a high emissivity.

When the p$^+$-type layer is made to emit light as a heavily doped region, a separation space must be formed between the p$^+$-type layer and the element substrate to form the bridge portion of the bridge-building structure, and the heat capacity of the heat-generating portion must be suppressed small in order to realize high-speed heat response characteristics.

For this purpose, the heavily doped region may be entirely used as the bridge portion, or the heavily doped region may be formed around only the center of the bridge portion.

Of the bridge portion, the highest-temperature portion is the center. If the heavily doped region is formed around only the center of the bridge portion, it is located at a high-temperature portion.

Relatively lightly doped regions having high thermal conductivities are located on the two sides of the heavily doped region of the bridge portion. This improves the thermal conductivity to the element substrate from a portion emitting infrared rays.

When the heavily doped region is formed around only the center of the bridge portion, the infrared emission quantity can be increased by forming, in the heavily doped region, a high-resistance portion narrower than each of the two ends of the bridge portion because the temperature of the high-resistance portion can be especially set high.

When the high-resistance portion is formed in the heavily doped region, the concentrations of the portions of the bridge portion on the two sides of the heavily doped region are set higher than that of the heavily doped region, and their resistances are set lower. With this setting, the difference in resistance value between the high-resistance portion and the remaining portion increases, an amount of heat from a portion except for the high-resistance portion becomes small, and hence infrared rays can be more efficiently emitted.

A package is arranged in the above-described infrared-emitting element, the element substrate is contained in the package, and infrared rays are emitted via a window formed in the package. With this arrangement, the package can be filled with an inert gas, and its interior can be evacuated. The bridge portion is not exposed into oxygen or water, and can be prevented from burning out and degradation.

In the use of this infrared-emitting element for an analysis system such as a gas analysis system, it is desired to enlarge the difference between the maximum and minimum emission quantities upon emitting infrared rays at a predetermined frequency. In addition, voltage driving is preferably performed by a voltage-driven circuit having a simple circuit arrangement.

In the infrared-emitting element of the present invention described above, as indicated by the solid line in FIG. 18D, the resistance temperature characteristics of the bridge portion are positive even at 800° C. or higher. Since a large current flows to rapidly generate heat, and the resistance value of the bridge portion increases to decrease the flowing current, the bridge portion does not burn out even by constant-voltage driving. The infrared-emitting element can be driven by applying a voltage having a frequency of 50 Hz or lower for a rectangular wave or 100 Hz or lower for a sine wave. Furthermore, stable constant-voltage driving can be performed.

Figure 18D:
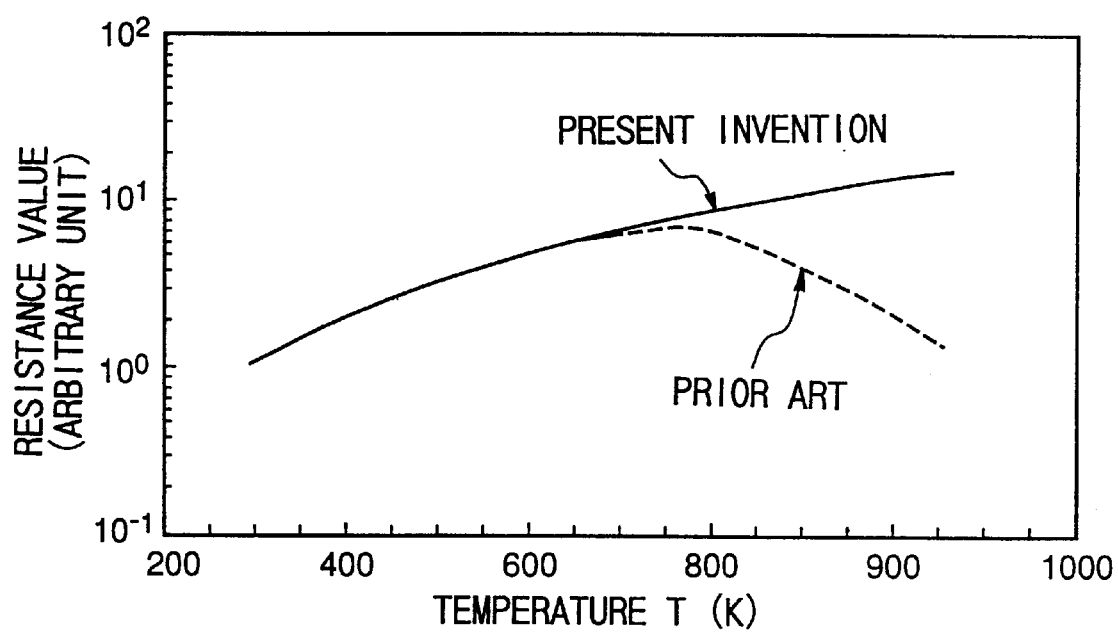
FIG. 18D is a graph showing the change characteristics of the resistance value with respect to the temperature of a bridge portion.

To the contrary, in the prior art using thermal diffusion of boron, as indicated by the broken line in FIG. 18D, the temperature characteristics of the resistance value of the bridge portion become negative at 500° C. or higher, and a phenomenon reverse to that of the infrared-emitting element of the present invention described above occurs. In constant-voltage driving, the element may burn out, and stable constant-voltage driving is difficult to perform, as described above.

In this case, in the infrared-emitting element of the present invention described above, the temperature modulation width of the heavily doped region can be set to 700° C. or higher even at the above frequency because of high-speed thermal response characteristics. Therefore, no chopper for intermittently shielding infrared rays is required.

In the above infrared-emitting element, no fusing of the bridge portion is observed even when the temperature of the bridge portion exceeds 1,100° C. as will be described later.

In general, when the temperature of the bridge portion is increased to 1,100° C. or higher, the bridge may fuse. For this reason, the temperature modulation width must be set to 1,100° C. or lower.

In the above infrared-emitting element, even upon applying a voltage having a frequency of 1000 Hz or higher, the bridge portion does not fuse, and a temperature modulation width of 100° C. or higher can be obtained. Accordingly, the infrared-emitting element can be used for purposes requiring infrared rays flashing at a high frequency.

An embodiment of an infrared-emitting element manufacturing method according to the present invention will be described below on the basis of the above general description with reference to the several views of the accompanying drawing.

Figure 1B:
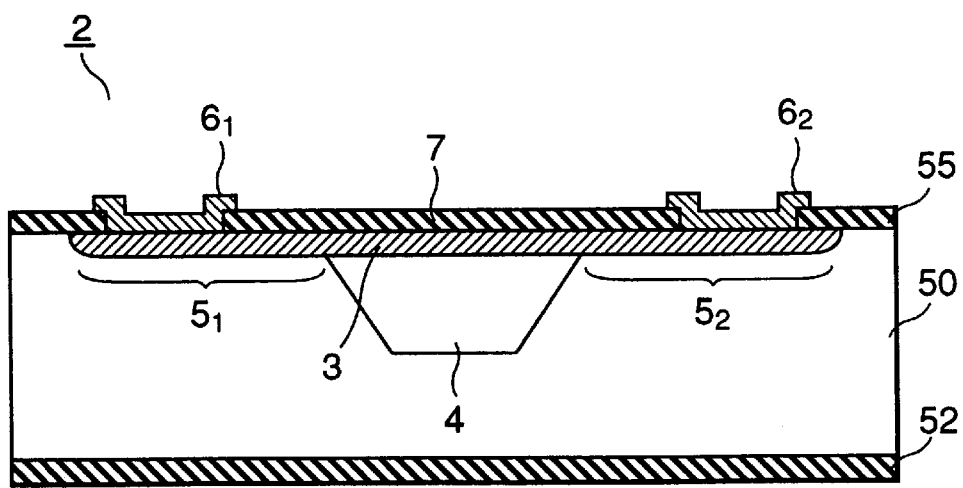
FIG. 1B is a sectional view taken along the line IB—IB in FIG. 1A.

FIG. 1A is a plan view of an infrared-emitting element 2 manufactured by the present invention, and FIG. 1B is a sectional view of the infrared-emitting element 2 taken along the line IB—IB.

The infrared-emitting element 2 comprises an element substrate 50 made up of an n-type single-crystal silicon substrate. A bridge (heat-generating) portion 3 which is constituted by a silicon structural layer having a heavily doped region in which boron is heavily doped as an impurity, and which is formed into a bridge-building structure by a separation space 4 is arranged on the element substrate 50.

An example of the manufacturing process will be explained as the first example of the manufacturing process with reference to FIGS. 2A to 2G.

An element substrate 50 made up of a single-crystal silicon substrate serving as an n-type semiconductor with a resistivity of 8 to 15 Ω·cm and the (100) plane is prepared.

Figure 2A:
FIGS. 2A to 2G are views, respectively, showing an example of an infrared-emitting element manufacturing method according to the present invention.

The element substrate 50 is thermally oxidized to form silicon oxide films 51 and 52 on the upper and lower surfaces of the element substrate 50, respectively (FIG. 2A).

In this case, the thickness of the silicon oxide film 51 is about 0.7 $\mu$m.

While masking a desired region on the surface of the silicon oxide film 51, the silicon oxide film 51 is etched by photolithography to form window portions which will serve as rectangular ohmic contact regions $5_1$ and $5_2$ shown in FIG. 1B. At the same time, a window portion 58 is formed at a portion which will serve as a narrow rectangular bridge portion 3 connecting the ohmic contact regions $5_1$ and $5_2$.

Figure 2B:
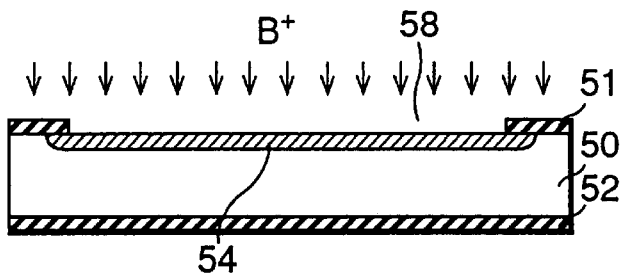
Figure 2C:
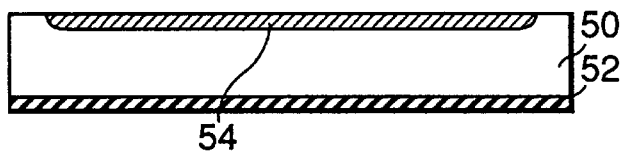

Using an ion implantation apparatus, boron ions (B$^+$) are implanted into the element substrate 50 at an acceleration voltage of 175 keV and a dose of $4.0 \times 10^{16}$ ions/cm$^2$, thereby forming an impurity layer 54 (FIG. 2B).

After exposing the surface of the element substrate 50 (FIG. 2C), the obtained structure is annealed to activate the impurity layer 54 in the nitrogen gas atmosphere at 1,100° C. to 1,200° C. for 5 min to 40 min and further in the wet oxygen atmosphere for about 25 min to 40 min.

Figure 2D:
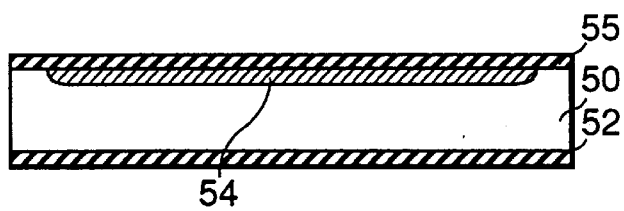

Thereafter, the element substrate 50 is thermally oxidized to form a 0.4-$\mu$m thick silicon oxide film 55 on the surface of the element substrate 50 (FIG. 2D).

Figure 2E:
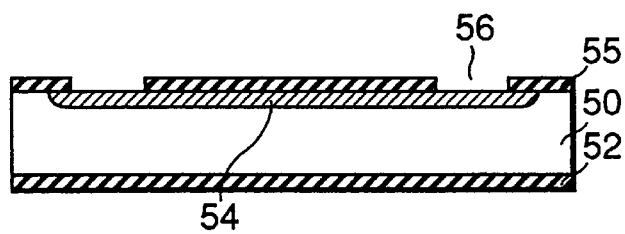

Of the silicon oxide film 55, the ohmic contact regions $5_1$ and $5_2$ are formed as rectangular windows to form contact holes 56 (FIG. 2E).

Figure 2F:
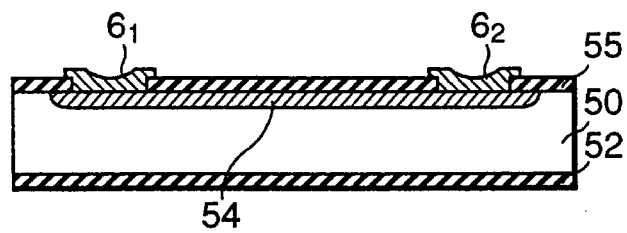

A thin metal film made from gold, aluminum, or the like is covered by deposition on the entire surface over the element substrate 50, and then patterned to form electrodes $6_1$ and $6_2$ (FIG. 2F).

When a silicon substrate having the (100) plane is wet-etched with an ammonia solution or the like, a lightly doped region is etched along the (111) plane, and no heavily doped region is etched.

After forming the silicon oxide films 55 as windows on the two sides of the impurity layer 54 serving as the bridge portion 3 in the longitudinal direction, the whole structure is dipped in a 29% ammonia solution at 90° C. As a result, anisotropic etching starts from the windows of the silicon oxide films 55, and the element substrate 50 below the bottom surface of the impurity layer 54 is removed to form a separation space 4.

Figure 2G:
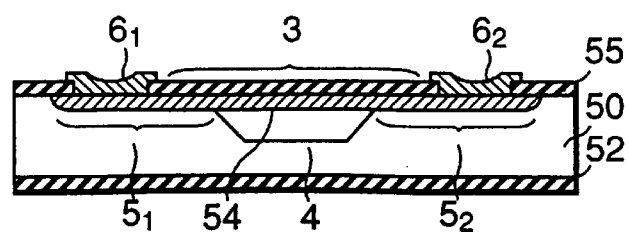

By this separation space 4, the bridge portion 3 of the bridge-building structure is formed (FIG. 2G).

The width of the bridge portion 3 is 200 $\mu$m.

The portion positioning above the separation space 4 has a length of 650 $\mu$m, and its surface has boride glass 7 formed after boron is diffused from the impurity layer 54 into the oxide film 55.

The inclined surface defining the separation space 4 has the (111) plane.

The bridge portion 3 having this structure is electrically connected to the electrodes $6_1$ and $6_2$.

In the infrared-emitting element 2 manufactured in this manner, when a voltage is applied across the electrodes $6_1$ and $6_2$, the bridge portion 3 generates heat to emit infrared rays.

To evaluate the infrared-emitting element 2 manufactured in this way, spectrum analysis is performed by a noncontacting infrared spectrophotometer for infrared rays within the range of 1.4 $\mu$m to 14.0 $\mu$m that are emitted when the bridge portion 3 is made to generate heat at 500° C.

Figure 8:
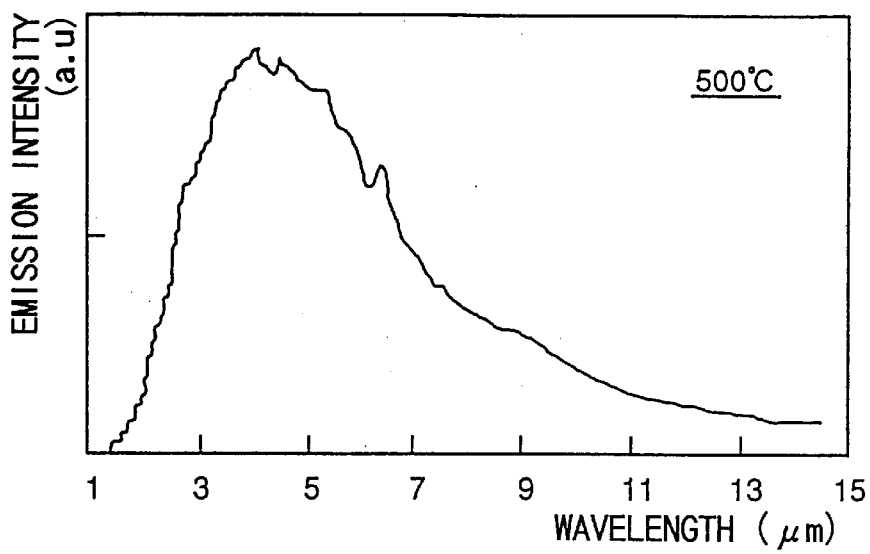
FIG. 8 is a graph showing the measurement results of the relationship between the wavelength of infrared rays emitted and the emission intensity.

FIG. 8 shows the measurement results.

From FIG. 8, an infrared ray having a wavelength of about 4 $\mu$m has the maximum intensity.

A sine-wave voltage having a frequency of 100 Hz is applied across the electrodes $6_1$ and $6_2$ of the infrared-emitting element 2 to measure the peak temperature of the bridge portion 3.

Figure 9:
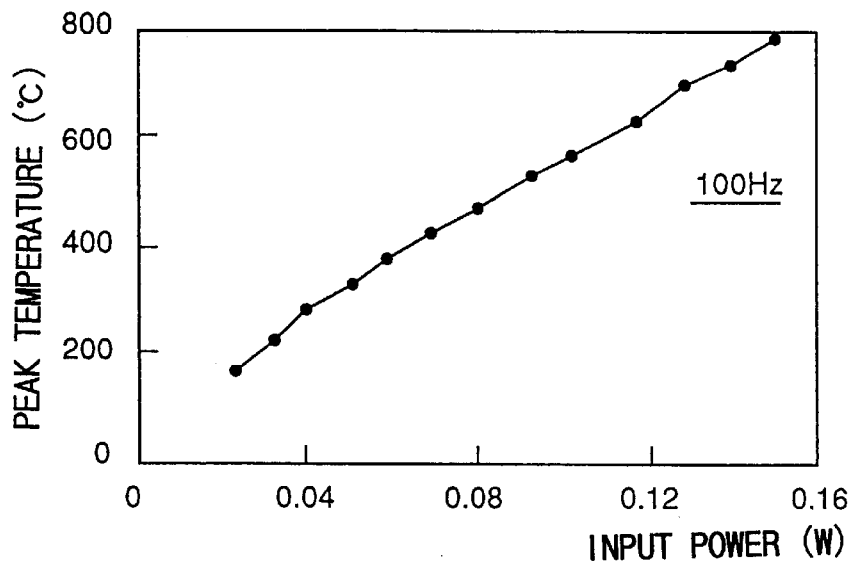
FIG. 9 is a graph showing the measurement results of the relationship between the applied power and the peak temperature.

FIG. 9 shows the relationship between the applied power and the peak temperature in this case.

From FIG. 9, the peak temperature linearly increases in proportion to the magnitude of the applied power.

FIG. 9 also indicates that the temperature of the bridge portion 3 can be increased up to 780° C. only by applying a power of 150 mW.

When a power of 700 mW was applied to the infrared-emitting element 2, and the state of the bridge portion 3 was observed, the center of the bridge portion 3 emitted light over a length of 200 $\mu$m.

Figure 10:
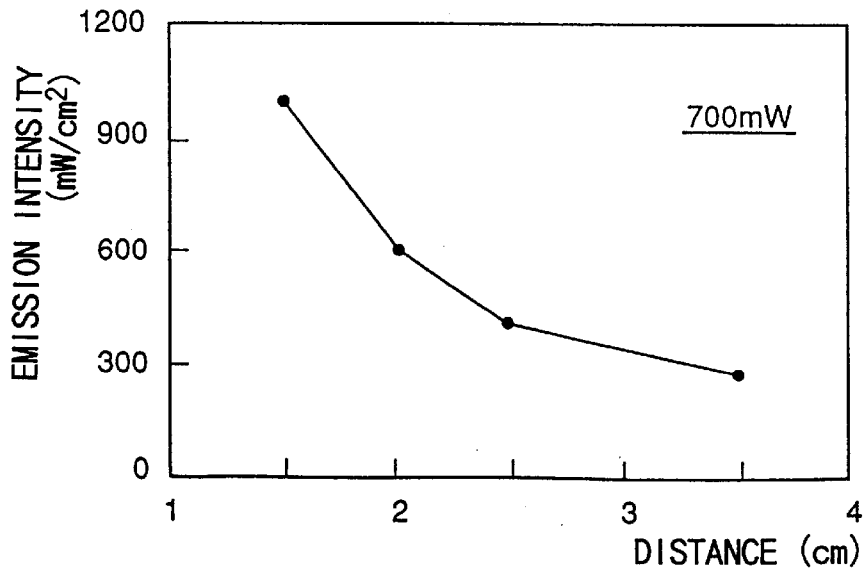
FIG. 10 is a graph showing the measurement results of the relationship between the distance and the intensity of infrared rays emitted.

FIG. 10 shows the relationship between the infrared emission intensity and the distance from the bridge portion 3 when the infrared emission intensity of the infrared-emitting element 2 at that time was measured at a portion distant from the bridge portion 3.

The temperature of the light-emitting portion was measured to be higher than 1,100° C., but no bridge portion 3 fused.

Figure 11:
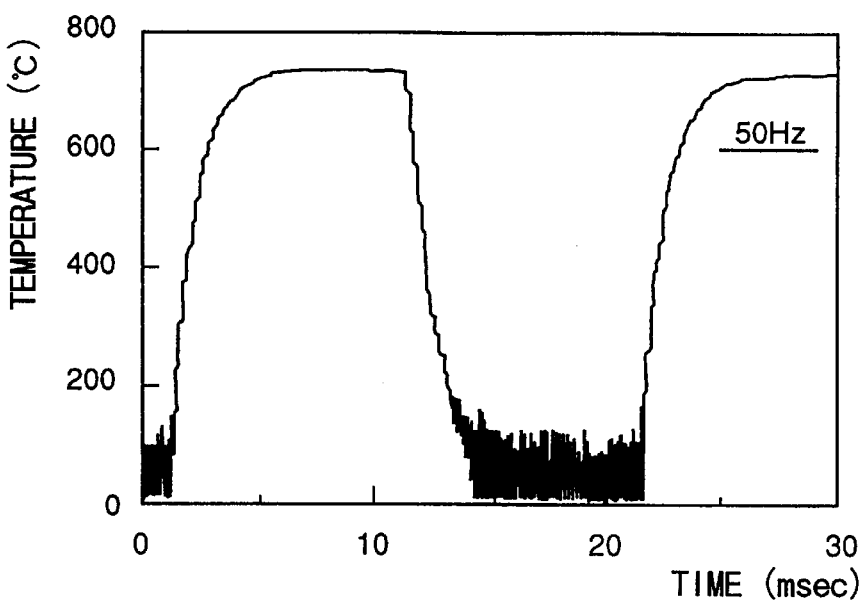
FIG. 11 is a graph showing the measurement results of thermal response characteristics with respect to a rectangular-wave voltage.

FIG. 11 shows the measurement results of the thermal response characteristics upon applying a rectangular-wave voltage having a frequency of 50 Hz and a duty of 50% across the electrodes $6_1$ and $6_2$ of the infrared-emitting element 2 by plotting the time (msec) on the abscissa and the temperature on the ordinate.

From FIG. 11, the temperature rises and drops steeply.

The thermal time constant at that time is 1.0 msec or less.

Figure 12A:
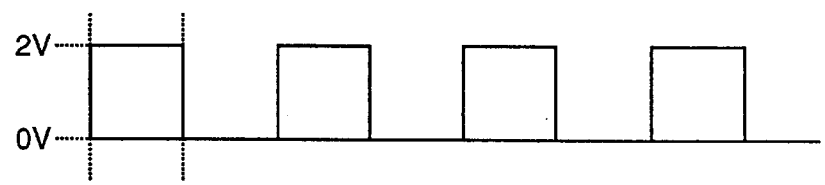
FIGS. 12A and 12B are graphs, respectively, showing the measurement results of current response characteristics with respect to the rectangular-wave voltage.

FIG. 12A shows the characteristics of a current flowing through the infrared-emitting element 2 upon applying a 2.0-V voltage having a frequency of 50 Hz and a duty of 50%.

A rectangular waveform on the upper side of FIG. 12A is a voltage waveform, and a waveform on the lower side is a current waveform.

Since the temperature of the bridge portion 3 is low immediately upon applying a voltage, the resistance value is small, and a current of 180 mA flows. As the bridge portion 3 generates heat, and the resistance value increases, the current decreases to be a constant current of 120 mA.

In this manner, since the infrared-emitting element 2 having the bridge portion 3 heavily doped with an impurity operates to substantially negatively feed back a current flowing through the bridge portion 3, it can stably emit infrared rays without using any constant-current circuit.

Figure 12B:
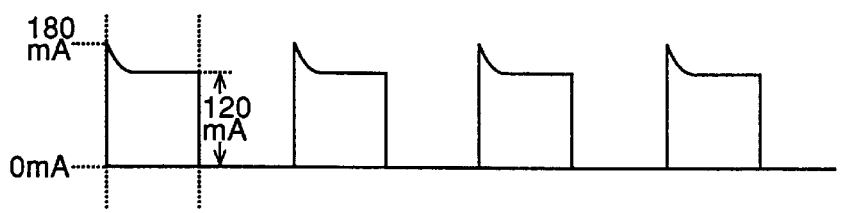
Figure 12C:
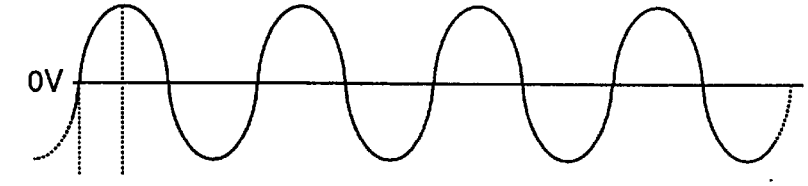
FIGS. 12C and 12D are graphs, respectively, showing the measurement results of thermal response characteristics with respect to a sine-wave voltage.
Figure 12D:
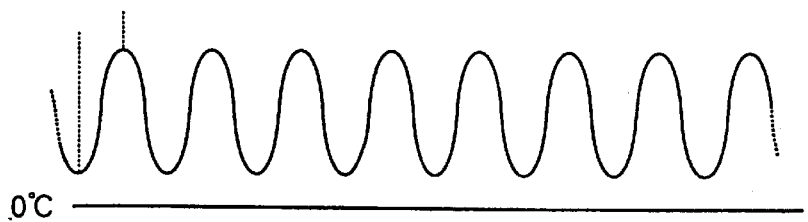

FIG. 12B shows the measurement results of thermal response characteristics upon applying a sine-wave voltage across the electrodes $6_1$ and $6_2$ of the infrared-emitting element 2, instead of the rectangular-wave voltage.

A waveform on the upper side of FIG. 12B is a sine-wave voltage waveform having frequency of 50 Hz and a duty of 50%, and one on the lower side is a 100-Hz temperature waveform which responds to the voltage waveform with good followability.

Figure 13:
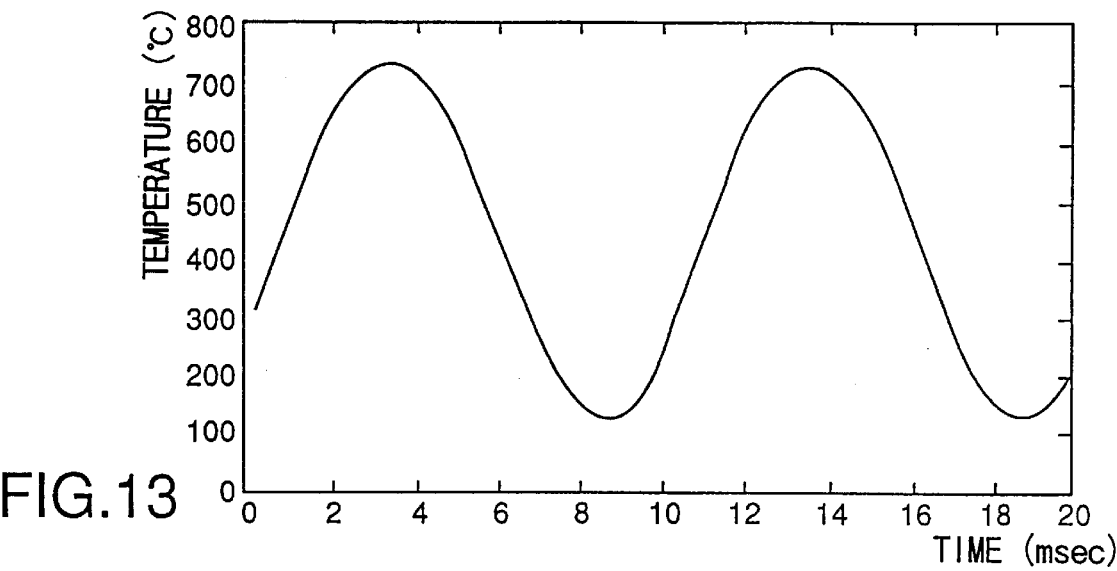
FIG. 13 is an enlarged view of the graphs of FIGS. 12C and 12D showing thermal response characteristics.

FIG. 13 is a partial enlarged view showing the temperature waveform.

From FIG. 13, a temperature modulation width of about 600° C. having the lowest temperature of about 120° C. and the highest temperature of about 720° C. is obtained at a frequency of 100 Hz, and a temperature modulation width of 700° C. or higher is obtained at a lower frequency.

Figure 14:
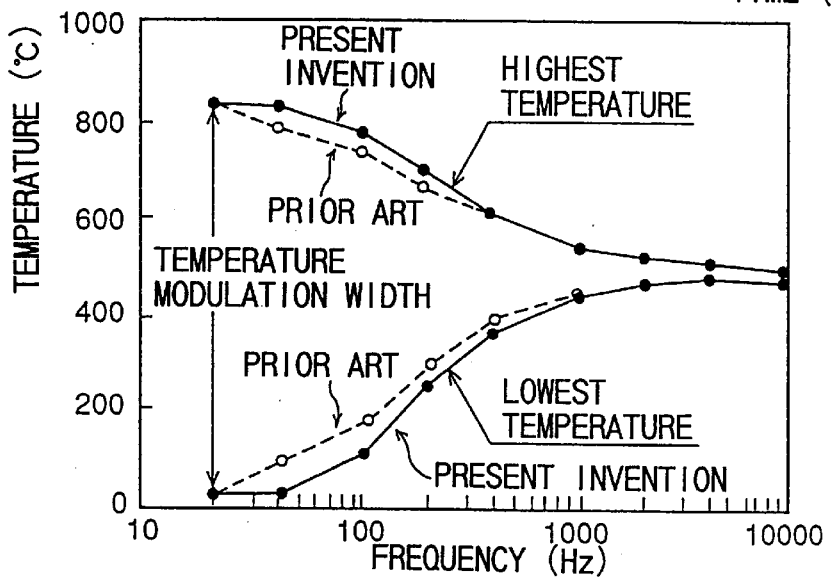
FIG. 14 is a graph showing the measurement results of the relationship between the frequency of a voltage to be applied and the highest and lowest temperatures.

FIG. 14 is a graph showing the measurement results of the relationship between the frequency and the temperature modulation width upon applying a voltage with a sine wave by plotting the frequency on the abscissa using the logarithmic scale, and the temperature on the ordinate.

As indicated by the solid lines in FIG. 14, in the present invention, the lowest temperature is equal to room temperature at a frequency of 40 Hz or lower, the highest temperature is 820° C., and the temperature modulation width is about 800° C.

As indicated by the solid lines in FIG. 14, in the present invention, the lowest temperature, the highest temperature, and the temperature modulation width are respectively 90° C., 790° C., and 700° C. at a frequency of 100 Hz.

As indicated by the solid lines in FIG. 14, in the present invention, even at a frequency higher than 100 Hz, the lowest temperature of 240° C., the highest temperature of 700° C., and a temperature modulation width of 460° C. are obtained as far as the frequency is 200 Hz. Even for a frequency of 1000 Hz, a temperature modulation width of 110° C. having the lowest temperature of 440° C. and the highest temperature of 550° C. is obtained.

To the contrary, as indicated by the broken lines in FIG. 14, in the prior art (thermal diffusion method), the lowest temperature, the highest temperature, and the temperature modulation width are respectively 190° C., 750° C., and 560° C. at a frequency of 100 Hz.

As indicated by the broken lines in FIG. 14, in the prior art (thermal diffusion method), even at a frequency higher than 100 Hz, the lowest temperature of 300° C., the highest temperature of 660° C., and a temperature modulation width of 360° C. are obtained as far as the frequency is 200 Hz.

That is, this represents that the present invention can obtain a larger temperature modulation width than in the prior art (thermal diffusion).

Although the case wherein the whole bridge portion 3 is made to be the heavily doped region has been described, only the center of the bridge portion may be made to be the heavily doped region.

FIGS. 3A to 3F and FIGS. 4A to 4D show the manufacturing process in the latter case.

The same reference numerals as in FIGS. 2A to 2G denote the same parts in FIGS. 3A to 3F and FIGS. 4A to 4D.

Of FIGS. 3A to 3F and FIGS. 4A to 4D, FIGS. 3A, 3C, 3E, 4A, and 4C are plan views, and FIGS. 3B, 3D, 3F, 4B, and 4D are sectional views taken along the lines IIIB—IIIB, IIID—IIID, IIIF—IIIF, IVB—IVB, and IVD—IVD, respectively.

In FIGS. 3A to 3F and FIGS. 4A to 4D, the ohmic regions $5_1$ and $5_2$ and the electrodes $6_1$ and $6_2$ shown in FIGS. 2F and 2G are not illustrated.

Figure 3A:
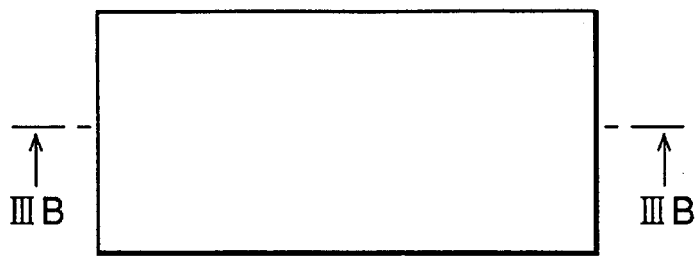
FIGS. 3A to 3F are views for explaining the first half process in another example of the manufacturing method according to the present invention.
Figure 3B:
Figure 3C:
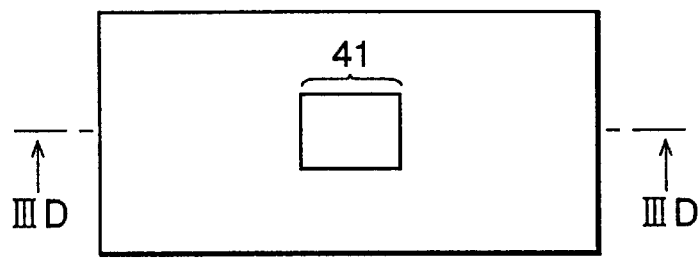
Figure 3D:
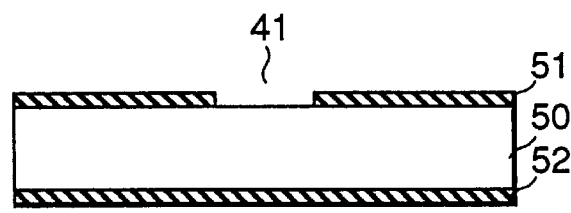

Silicon oxide films 51 and 52 are respectively formed on the upper and lower surfaces of an element substrate 50 having the (100) plane (FIGS. 3A and 3B).

The silicon oxide film 51 is subjected to photolithography and etching to form a rectangular window portion 41 having a dimension of about 200 μm×200 μm around the center of the silicon oxide film 51.

Figure 3E:
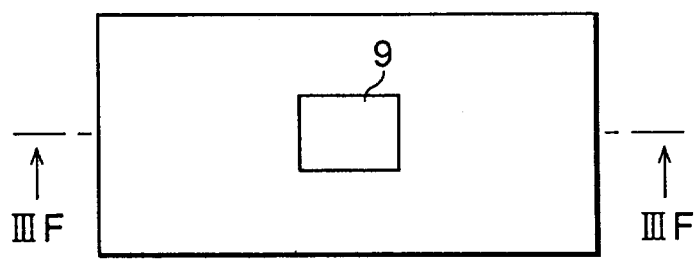
Figure 3F:
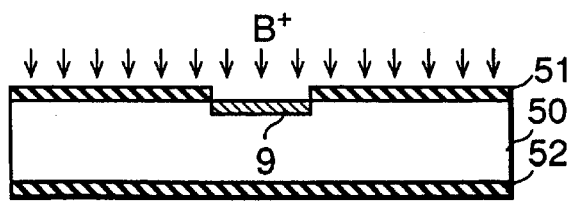

By ion implantation, boron ions (B$^+$) are implanted at a large dose in the element substrate 50 on the bottom surface of the window portion 41 to form a rectangular heavily doped region 9 having a dimension of about 200 μm×200 μm (FIGS. 3E and 3F).

Figure 4A:
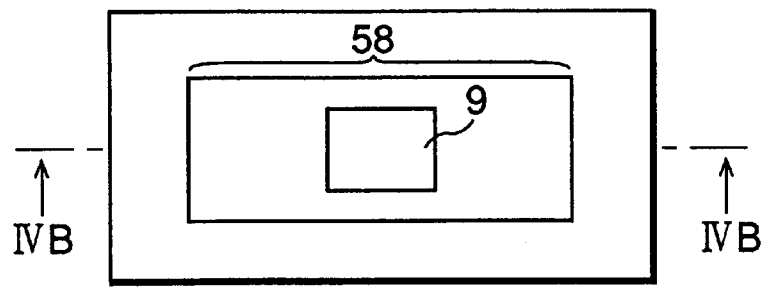
FIGS. 4A to 4D are views for explaining the process subsequent to the process in FIGS. 3A to 3F.
Figure 4B:
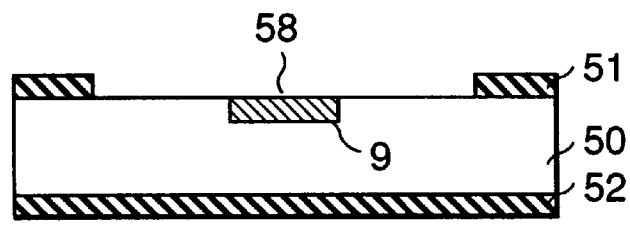
Figure 4C:
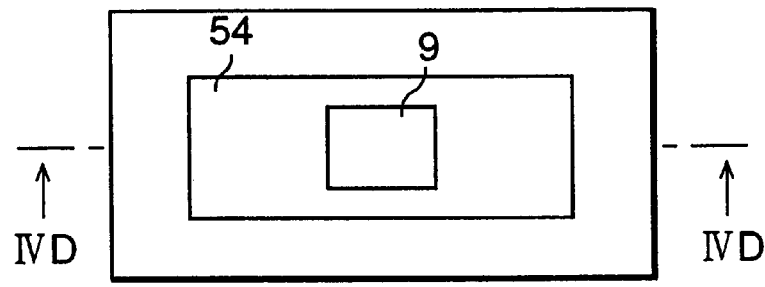
Figure 4D:
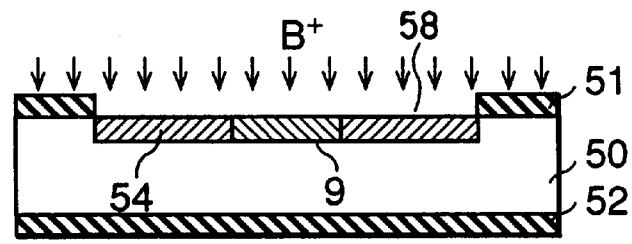

Of the silicon oxide film 51, in a narrow region surrounding the heavily doped region 9, a window portion 58 is formed (FIGS. 4A and 4B).

Boron ions (B$^+$) are implanted in the element substrate 50 on the bottom surface of the window portion 58 at a dose smaller than that of the heavily doped region 9.

By the same manufacturing steps as those in FIGS. 2C to 2G, a separation space 4' is formed by anisotropic etching, and a bridge portion 3' having a bridge-building structure is formed.

Figure 5A:
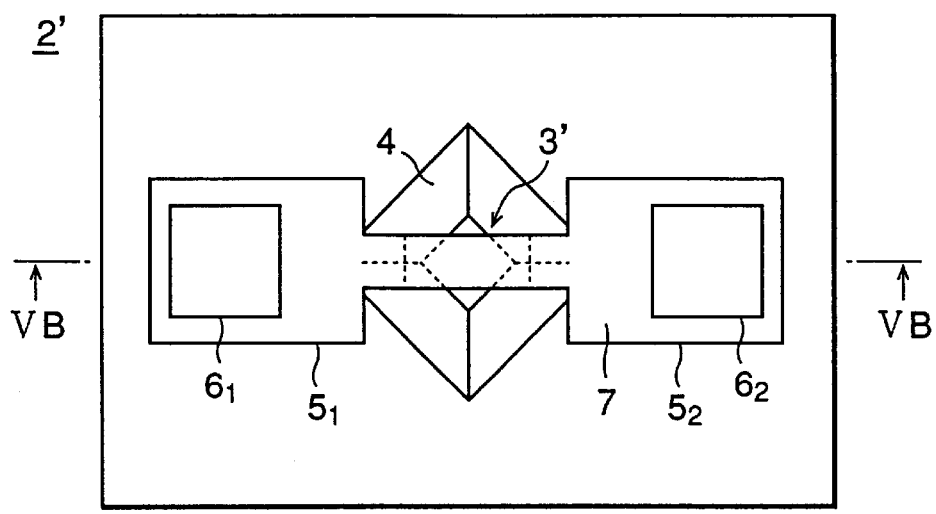
FIG. 5A is a plan view showing another example of the infrared-emitting element manufactured by the present invention.
Figure 5B:
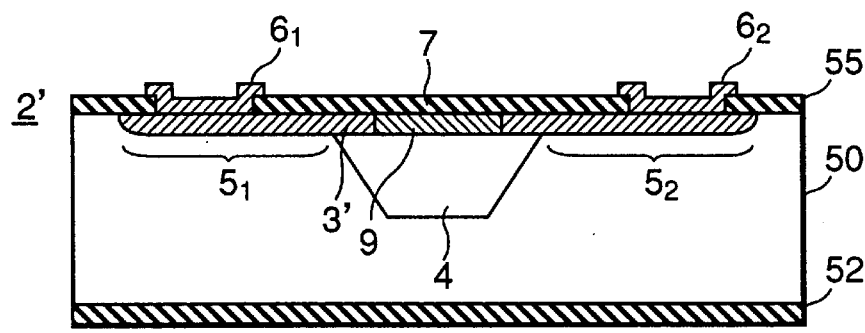
FIG. 5B is a sectional view taken along the line VB—VB in FIG. 5A.

By the above process, an infrared-emitting element 2' shown in a plan view of FIG. 5A and a sectional view of FIG. 5B taken along the line VB—VB is manufactured.

As described above, the heavily doped region 9 is positioned at the center of the bridge portion 3' of the infrared-emitting element 2'. The dose of boron ions at the portions of the bridge portion 3' on the two sides of the heavily doped region 9 is smaller than that of the heavily doped region 9, and the concentration is relatively low.

The case wherein the separation space is defined below the bridge portion using anisotropic etching has been described. The infrared-emitting element of the present invention can also be manufactured by silicon micromachining for forming a separation space using a sacrificial layer.

The manufacturing process will be explained with reference to FIGS. 6A to 6C.

Figure 6A:
FIGS. 6A to 6C are views, respectively, showing an example of an infrared-emitting element manufacturing method using a sacrificial layer.
Figure 6B:
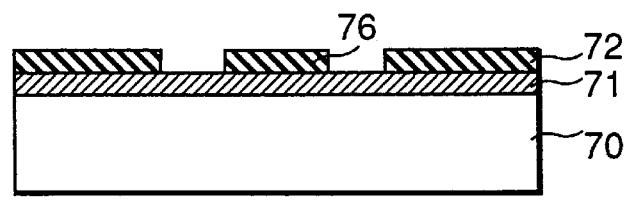
Figure 6C:
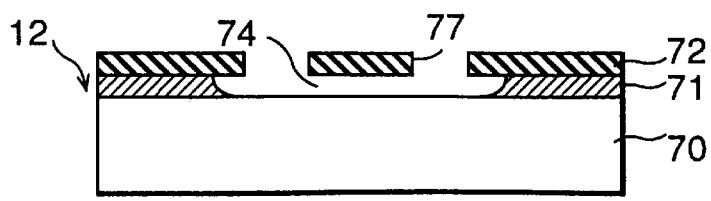

In FIGS. 6A to 6C, reference numeral 70 denotes an element substrate, which is made from a silicon substrate.

A sacrificial layer 71 made from a silicon thermal oxide film is formed on the entire surface of the element substrate 70.

A structural layer 72 made from a silicon structure is formed on the entire surface of the sacrificial layer 71 (FIG. 6A).

The structural layer 72 is patterned and etched to form a rectangular region 76 made from the structural layer 72 and shaped narrow (FIG. 6B).

The two ends of the rectangular region 76 in the longitudinal direction are connected to the structural layers 72 left.

The surface of the sacrificial layer 71 is exposed on the two sides of the rectangular region 76. By dipping the whole element substrate 70 into an etching solution, the sacrificial layer 71 below the rectangular region 76 is removed by side etching to form a bridge portion 77 shaped into a bridge-building structure by a separation space 74 (FIG. 6C).

An impurity is doped in the whole bridge portion 77 at a large dose to form a heavily doped region. Alternatively, an impurity is doped at the center of the bridge portion 77 at a large dose to form a heavily doped region (neither of the heavily doped region nor the electrode is shown). As a result, an infrared-emitting element 12 can be obtained.

In the above-mentioned infrared-emitting element 12, since the structural layer 72 is connected to the element substrate 70 via the sacrificial layer 71, the heat of the bridge portion 77 can only be transferred to the element substrate 70 via the sacrificial layer 71.

In general, the sacrificial layer must have high etching selectivity with silicon. For this purpose, the sacrificial layer used is normally an oxide such as a silicon oxide film.

In this case, thermal diffusion caused by heat conduction from the bridge portion 77 hardly occurs because the thermal conductivity of the oxide is lower than that of a silicon crystal. The thermal response characteristics of the heat-generating element 12 are poorer than those of the infrared-emitting elements 2 and 2' described above.

A manufacturing method capable of obtaining an infrared-emitting element having high-speed thermal response characteristics even in the use of the sacrificial layer will be described with reference to FIGS. 7A to 7F.

Figure 7A:
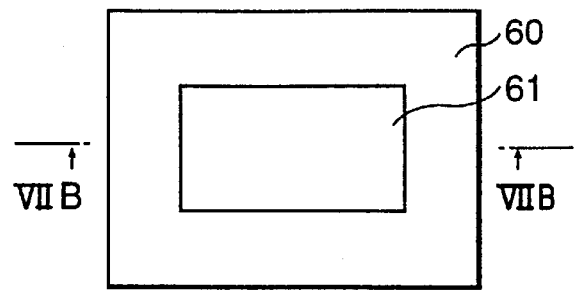
FIGS. 7A to 7F are views, respectively, showing another example of the manufacturing method using a sacrificial layer.
Figure 7B:
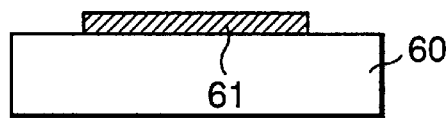
Figure 7C:
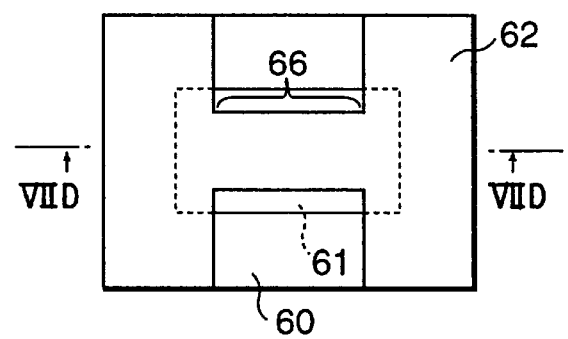
Figure 7D:
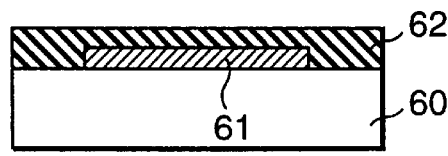
Figure 7E:
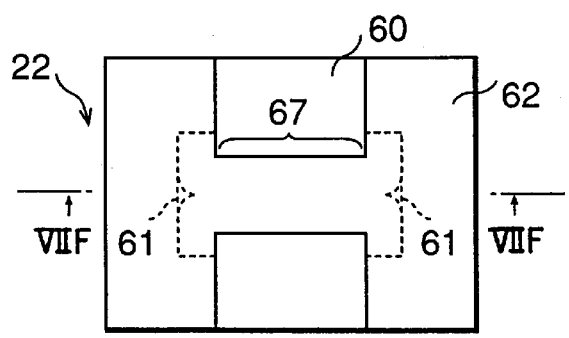
Figure 7F:
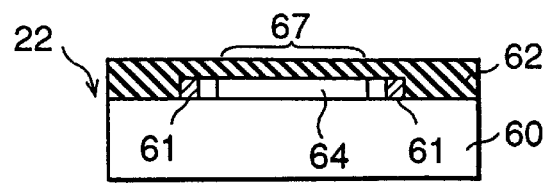

FIGS. 7A, 7C, and 7E are plan views, and FIGS. 7B, 7D, and 7F are sectional views taken along the lines VIIB—VIIB, VIID—VIID, and VIIF—VIIF in FIGS. 7A, 7C, and 7E, respectively.

In FIGS. 7A to 7F, reference numeral 60 denotes an element substrate, which is made from a silicon substrate.

A silicon oxide film is formed on the surface of the element substrate 60. By photolithography and etching, the silicon oxide film is formed into a rectangular shape, thereby forming a sacrificial layer 61 (FIGS. 7A and 7B).

A silicon film is deposited on the entire surface of the element substrate 60, and the surface of the silicon film is planarized to form a structural layer 62. Thereafter, the structural layer 62 is formed as a window to make the structural layer 62 at the center of the element substrate 60 narrow, thereby forming a rectangular region 66 (FIGS. 7C and 7D).

On the two sides of the rectangular region 66, the upper and side surfaces of the sacrificial layer 61 are exposed. By dipping the whole element substrate 60 into an etching solution, the portion of the sacrificial layer 61 below the rectangular region 66 is removed by side etching. As a result, a bridge portion 67 having a separation space 64 below the rectangular region 66 and shaped into a bridge-building structure is formed by the rectangular region 66 (FIGS. 7E and 7F).

An impurity is doped in the whole bridge portion 67 at a large dose to form a heavily doped region. Alternatively, a heavily doped region is formed around the center in advance (neither of the heavily doped region nor the electrode is shown). As a result, an infrared-emitting element 22 in which the bridge portion 67 is directly connected to the element substrate 60 without being through the sacrificial layer can be manufactured.

A method of manufacturing an infrared-emitting element having a higher emissivity will be explained with reference to FIGS. 20A and 20B.

Figure 20A:
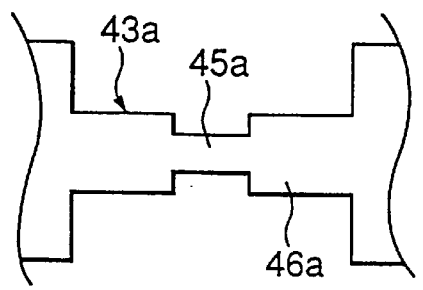
FIG. 20A is a view showing an example of the bridge portion when the infrared emissivity is increased.
Figure 20B:
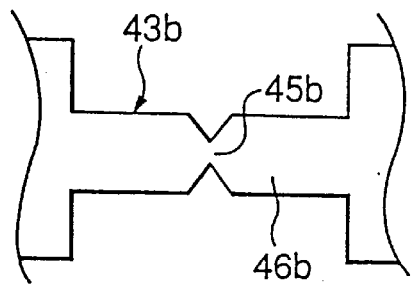
FIG. 20B is a view showing another example of the bridge portion when the infrared emissivity is increased.

FIGS. 20A and 20B show the bridge portion of this infrared-emitting element.

Reference numeral 43a in FIG. 20A denotes a bridge portion. A high-resistance portion 45a narrower than each of two end portions 46a of the bridge portion 43a is formed within a heavily doped region (not shown) formed at the center of the bridge portion 43a.

The resistance value of the high-resistance portion 45a per unit length is set larger than those of the two end portions 46a. Upon energizing the bridge portion 43a, the temperature of the high-resistance portion 45a increases to be higher than those of the two end portions 46a.

Accordingly, this infrared-emitting element emits a larger infrared emission quantity from the heavily doped region.

To increase the infrared emission quantity, a constriction may be formed in a heavily doped region (not shown) formed at the center of a bridge portion 43b to form a high-resistance portion 45b, and the high-resistance portion 45b may be made narrower than each of two end portions 46b, as shown in FIG. 20B.

To increase the difference between the resistance value of the high-resistance portion 45a or 45b and those of the two end portions 46a or 46b, and increase the temperature of only the high-resistance portion 45a or 45b, an impurity is doped to set a higher impurity concentration at the two end portions 46a or 46b than at the heavily doped region where the high-resistance portion 45a or 45b is formed, thereby setting a small resistance value at these portions.

A method of manufacturing an infrared-emitting element having a package will be explained with reference to FIGS. 19A and 19B.

Figure 19A:
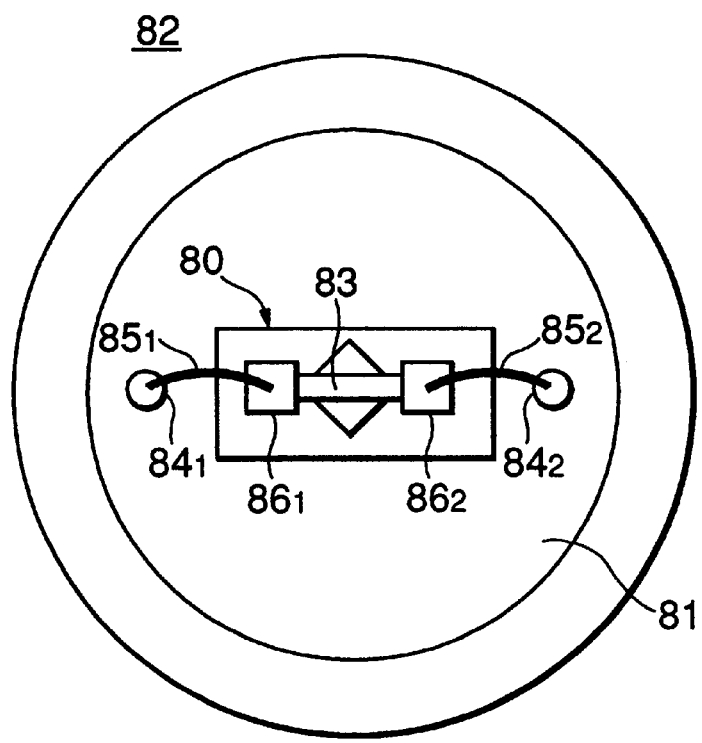
FIG. 19A is a plan view showing the infrared-emitting element when a package is removed.
Figure 19B:
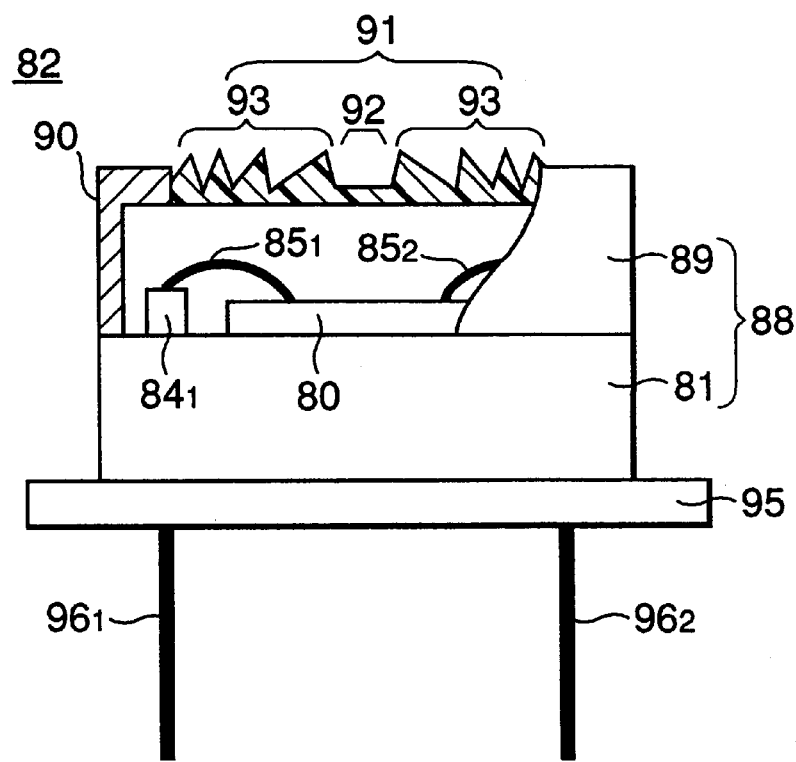
FIG. 19B is a partially cutaway view of the infrared-emitting element when the package is mounted.

In FIGS. 19A and 19B, reference numeral 82 denotes an infrared-emitting element. The infrared-emitting element 82 comprises a package 88 made up of a mount 81 and a cap 89.

FIG. 19A is a plan view of the state wherein the cap 89 is detached, and FIG. 19B is a side view of the state wherein the cap 89 is attached, and partially cut away to show the inside structure.

An element substrate 80 made from a silicon substrate is fixed to the surface of the mount 81.

The element substrate 80 comprises a bridge portion 83 having a center serving as a heavily doped region, and electrodes $86_1$ and $86_2$ electrically connected to the bridge portion 83.

Package electrodes $84_1$ and $84_2$ are fixed to the surface of the mount 81 while being insulated from the mount 81.

A flange 95 is arranged on the lower surface of the mount 81. Leads $96_1$ and $96_2$ are led from the flange 95 airtightly by resin sealing.

One end of each of the leads $96_1$ and $96_2$ is positioned outside the package 88, whereas the other end is electrically connected to a corresponding one of the package electrodes $84_1$ and $84_2$ within the mount 81.

The package electrodes $84_1$ and $84_2$ are respectively connected to the electrodes $86_1$ and $86_2$ via metal wires $85_1$ and $85_2$ made from gold, aluminum, or the like. When a voltage is applied across the leads $96_1$ and $96_2$, a current flows from the electrodes $86_1$ and $86_2$ to the bridge portion 83.

The cap 89 has a bottomed-cylindrical shape, and comprises a cylindrical portion 90 slightly projecting from the bottom, and an infrared-transmitting portion 91 arranged at the projection and constituting the bottom.

The mount 81 and the cylindrical portion 90 are made from a metal material.

The cap 89 is capped on the mount 81 in an inert atmosphere of $N_2$, Ar, or Ne.

While the space defined by the cap 89 and the mount 81 is filled with an inert gas, the mount 81 and the cap 89 are airtightly welded and fixed to each other.

With this arrangement, the element substrate 80 inside the package 88 is placed in the non-oxidizing atmosphere.

In this package 88, the infrared-transmitting portion 91 is positioned above the element substrate 80, and the bottom surface of the infrared-transmitting portion 91 is substantially parallel to the element substrate 80.

The infrared-transmitting portion 91 is made from a silicon substrate.

In this case, the crystal of the silicon substrate used for the infrared-transmitting portion 91 has filter characteristics to transmit infrared rays but not to transmit visible light and ultraviolet light. When the bridge portion 83 generates heat upon energization, of infrared light emitted by the heavily doped region, no unwanted short-wavelength light passes through the infrared-transmitting portion 91, and only infrared rays are emitted outside the package 88.

Since an anti-reflection film is coated on the lower surface of the infrared-transmitting portion 91, infrared rays can be efficiently incident on the infrared-transmitting portion 91.

The center of the surface of the infrared-transmitting portion 91 has a window portion 92 formed flat and thin to allow infrared rays to travel straight in passing through the infrared-transmitting portion 91.

Concentric grooves centered on the center of the window portion 92 are cut around the window portion 92.

The respective concentric grooves form a Fresnel lens 93 for focusing infrared rays.

At the infrared-transmitting portion 91, the window portion 92 is positioned above the heavily doped region at the center of the bridge portion 83. Infrared rays emitted by the bridge portion 83 and diffused in the package 88 are refracted by the Fresnel lens 93 in passing through the infrared-transmitting portion 91, and become substantially parallel rays when they are emitted outside the package 88.

The infrared rays emitted by the infrared-emitting element 82 can, therefore, reach a distant portion without diffusion.

Although the infrared-transmitting portion 91 is made from a silicon substrate, a substrate made from another material such as a sapphire substrate can be used in accordance with a necessary infrared wavelength.

When the sapphire substrate constitutes the infrared-transmitting portion, an interference filter may be arranged on the lower surface of the substrate in order to transmit infrared rays having a specific wavelength.

Figure 21:
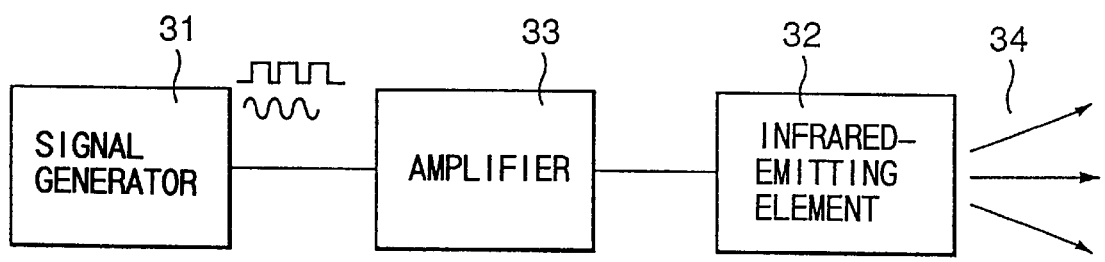
FIG. 21 is a block diagram showing an example of a circuit for driving the infrared-emitting element.
Figure 22:
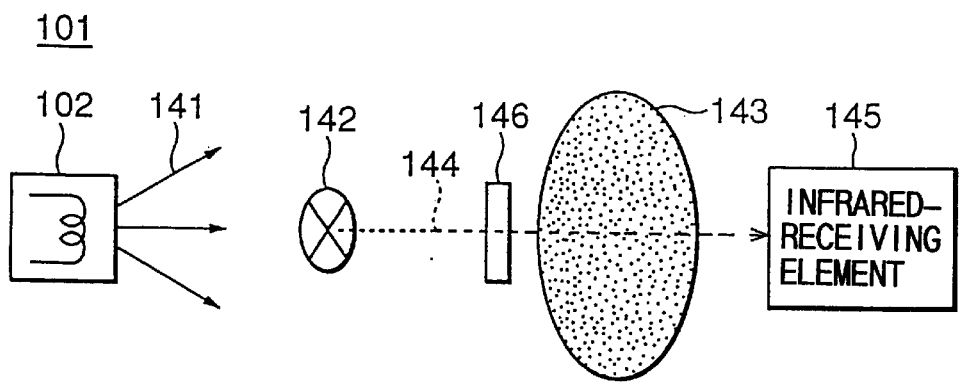
FIG. 22 is a view showing an example of a gas analysis system using a conventional infrared-emitting element.

To drive the above-described infrared-emitting element, a voltage having a rectangular or sine wave generated by a waveform generator 31 is input to an amplifier 33, and the voltage amplified by the amplifier 33 is applied to an infrared-emitting element 32 to emit infrared rays 34 from the infrared-emitting element 32 by voltage driving, like the circuit shown in a block diagram of FIG. 21.

As far as the frequency of the rectangular or sine wave is 50 Hz or lower for the rectangular wave and 100 Hz or lower for the sine wave, infrared rays can be emitted with a temperature modulation width of 700° C. or higher (see FIGS. 11 to 14).

Even if the frequency exceeds 100 Hz, infrared rays can be emitted with a temperature modulation width of at least 100° C. so long as the frequency is 1000 Hz or lower (see FIG. 14).

In the above description, the heavily doped region is formed of the p$^+$-type layer, but may be formed of an n$^+$-type layer prepared by heavily doping an n-type impurity.

The case wherein the infrared-emitting element of the present invention is used to emit infrared rays has been described. However, the infrared-emitting element manufactured by the present invention can also be used for an apparatus for, e.g., heating of a small region of a body to be heated, in addition to infrared emission.

Applications to such an apparatus and a method of driving the apparatus are also the same as those described above in relation to the infrared-emitting element manufactured by the present invention.

As has been described above, according to the present invention, a high-performance infrared-emitting element having a high infrared emissivity from a bridge portion made from a silicon structure, and good thermal response characteristics can be efficiently manufactured.

Particularly, in the present invention, boron is doped as an impurity using ion implantation, and annealing suitable for activation of the impurity layer is performed. Accordingly, even a high-performance infrared-emitting element can be manufactured with high mass productivity, and its manufacturing cost can be decreased.

In the present invention, since the bridge portion is made from silicon, and boron is doped as an impurity by ion implantation, a space can be formed below the bottom surface of the bridge portion by wet etching, and a low-cost infrared-emitting element can be manufactured.

In the present invention, when a heavily doped region is formed at only the center of the bridge portion, a narrow high-resistance portion is formed in the heavily doped region. With this structure, the temperature of the high-resistance portion can be set high to increase the infrared emission quantity.

In the present invention, by setting a high concentration on the two sides of the heavily doped region where the high-resistance portion is formed, infrared rays can be more efficiently emitted.

In the present invention, by containing an element substrate having the bridge portion in a package, the element substrate can be placed in an inert gas atmosphere or a vacuum atmosphere. The bridge portion which is heated to high temperatures is not exposed to oxygen and water, and the infrared-emitting element can be prevented from burning out and degradation. A high-reliability, long-service-life infrared-emitting element can be obtained.

In the present invention, if the infrared-transmitting portion of the above package is made from a silicon substrate, the infrared-emitting element itself can function as an optical filter because the silicon substrate does not transmit visible light or ultraviolet light.

In the present invention, a Fresnel lens is formed at the infrared-transmitting portion by cutting concentric grooves in the above-described silicon substrate. With this structure, infrared rays emitted by the bridge portion and temporarily diffused can be refracted in passing through the Fresnel lens, and become substantially parallel rays. Accordingly, the infrared rays emitted by the infrared-emitting element can reach a distant portion.

In the present invention, the temperature coefficient of the resistance of the bridge portion is positive, and the time constant is about 1 msec to realize high-speed thermal response characteristics. As long as the frequency is 50 Hz or lower for a rectangular wave or 100 Hz or lower for a sine wave, even if the infrared-emitting element is operated by voltage driving, the bridge portion does not fuse owing to continuous flowing of a large current. Infrared rays can be emitted with a temperature modulation width of 700° C. or higher.

According to the present invention, a method of manufacturing an infrared-emitting element capable of constituting a gas analysis system without arranging any chopper, and an infrared-emitting element manufactured by this method can be provided.

According to the present invention, even if the infrared-emitting element is driven by a voltage having a frequency higher than 100 Hz, it can emit infrared rays with a temperature modulation width of 100° C. or higher so far as the frequency is 1000 Hz or lower. Therefore, an infrared-emitting element manufacturing method which can easily cope with an automobile gas analysis system requiring high-frequency infrared rays, and an infrared-emitting element manufactured by this method can be provided.

According to the present invention, an infrared-emitting element manufacturing method capable of efficiently manufacturing, with high mass productivity at low cost, a high-performance infrared-emitting element which has high-speed thermal response characteristics and a high infrared emissivity, can be driven by a simple driving circuit, and enables stable constant-voltage driving, and an infrared-emitting element manufactured by the above method can be provided.

What is claimed is:

1. An infrared-emitting element manufacturing method comprising:

preparing a single-crystal silicon substrate serving as an element substrate;

forming an impurity layer as a heavily doped region by doping boron from an upper surface side of said element substrate by ion implantation at a peak concentration of not less than $1.5 \times 10^{19}$ atoms/cm$^3$ in order to form a heat-generating portion having a predetermined shape on said element substrate;

performing annealing for said element substrate having said impurity layer under a predetermined condition for activating said impurity layer;

forming a pair of electrodes to ohmic-contact two ends of said impurity layer in order to form an applying portion of a driving voltage for said heat-generating portion on said element substrate; and removing a lower portion of said impurity layer including a middle portion by anisotropic etching and forming a separation space in order to form said heat-generating portion on said element substrate into a bridge shape, wherein, when the driving voltage is applied to said heat-generating portion via said pair of electrodes, said heat-generating portion having the bridge shape can emit infrared rays in accordance with the driving voltage.

2. An infrared-emitting element manufacturing method according to claim 1, wherein the ion implantation is performed by doping boron at a dose of at least not less than $3.0 \times 10^{14}$ ions/cm$^2$.

3. An infrared-emitting element manufacturing method according to claim 1, wherein said heat-generating portion is formed to have a thickness of not less than 0.2 μm and not more than 5 μm.

4. An infrared-emitting element manufacturing method according to claim 1, wherein said heat-generating portion is formed to emit infrared rays at an emissivity of not less than 0.5.

5. An infrared-emitting element manufacturing method according to claim 1, wherein the heavily doped region is arranged at a center of said heat-generating portion, and a high-resistance portion narrower than each of two ends of said heat-generating portion is formed in the heavily doped region.

6. An infrared-emitting element manufacturing method according to claim 5, wherein regions each having a higher impurity concentration than an impurity concentration of the heavily doped region are formed on two sides of the heavily doped region.

7. An infrared-emitting element manufacturing method according to claim 1, wherein the heavily doped region is arranged at a center of said heat-generating portion, and regions each having a lower impurity concentration than an impurity concentration of the heavily doped region are formed on two sides of the heavily doped region.

8. An infrared-emitting element manufacturing method according to claim 1, further comprising:

preparing a package having an infrared-transmitting portion capable of transmitting infrared rays; and airtightly containing said element substrate in said package, wherein infrared rays can be emitted via said infrared-transmitting portion.

9. An infrared-emitting element manufacturing method according to claim 8, wherein said infrared-transmitting portion is formed of a silicon plate.

10. An infrared-emitting element manufacturing method according to claim 9, further comprising forming a Fresnel lens by cutting a concentric groove in said silicon plate.

11. An infrared-emitting element manufacturing method according to claim 1, wherein in order to make the heavily doped region of said heat-generating portion generate heat and emit infrared rays, when a voltage having a frequency of not more than 100 Hz is applied across said pair of electrodes, a temperature modulation width of the heavily doped region is set to not less than 700° C. and not more than 1,100° C.

12. An infrared-emitting element manufacturing method according to claim 1, wherein in order to make the heavily doped region of said heat-generating portion generate heat and emit infrared rays, when a voltage having a frequency of not more than 1000 Hz is applied across said pair of electrodes, a temperature modulation width of the heavily doped region is set to not less than 100° C.

13. An infrared-emitting element manufacturing method according to claim 1, wherein the annealing is performed in a nitrogen gas atmosphere at 1,100° C. to 1,200° C. for 5 min to 40 min and further in a wet oxygen atmosphere for about 25 min to 40 min.

\* \* \* \* \*

UNITED STATES PATENT AND TRADEMARK OFFICE
CERTIFICATE OF CORRECTION

PATENT NO. : 6,204,083 B1  Page 1 of 1
DATED : March 20, 2001
INVENTOR(S) : Setsuo Kodato et al.

It is certified that error appears in the above-identified patent and that said Letters Patent is hereby corrected as shown below:

<u>Title page,</u>
Item [56], ABSTRACT, line 1, after "order" delete ",".

Signed and Sealed this

Nineteenth Day of February, 2002

Attest:

JAMES E. ROGAN
*Attesting Officer*     *Director of the United States Patent and Trademark Office*